*(12)* United States Patent
Hoyt et al.

(10) Patent No.: US 12,117,410 B1
(45) Date of Patent: Oct. 15, 2024

(54) CONCURRENT THERMAL MEASUREMENTS OF A PLURALITY OF SAMPLES

(71) Applicant: ThermoCap Laboratories Inc., Portland, OR (US)

(72) Inventors: Joshua King Hoyt, Portland, OR (US); Matthew Walter Eskew, Portland, OR (US); David John Sayler, Portland, OR (US); Albert Steven Benight, Milwaukie, OR (US)

(73) Assignee: ThermoCap Laboratories Inc., Portland, OR (US)

( * ) Notice: Subject to any disclaimer, the term of this patent is extended or adjusted under 35 U.S.C. 154(b) by 0 days.

(21) Appl. No.: 18/632,227

(22) Filed: Apr. 10, 2024

Related U.S. Application Data

(60) Provisional application No. 63/495,777, filed on Apr. 13, 2023.

(51) Int. Cl.
  *G01N 25/00* (2006.01)
  *G01N 25/48* (2006.01)
(52) U.S. Cl.
  CPC ..... *G01N 25/4866* (2013.01); *G01N 25/4853* (2013.01)
(58) Field of Classification Search
  CPC . G01N 25/4866; G01N 25/4853; G01K 11/00
  USPC .......... 422/51; 436/147; 374/10–12
  See application file for complete search history.

(56) References Cited

U.S. PATENT DOCUMENTS

| | | | |
|---|---|---|---|
| 4,255,961 A | | 3/1981 | Biltonen et al. |
| 5,248,199 A | | 9/1993 | Reading |
| 5,312,587 A | * | 5/1994 | Templer ............ G01N 25/4853 |
| | | | 422/51 |
| 5,507,410 A | * | 4/1996 | Clark ................. B01L 3/50853 |
| | | | 414/754 |
| 5,599,104 A | * | 2/1997 | Nakamura ......... G01N 25/4833 |
| | | | 374/11 |
| 6,193,413 B1 | | 2/2001 | Lieberman |
| 6,488,406 B2 | | 12/2002 | Danley |

(Continued)

FOREIGN PATENT DOCUMENTS

| | | | |
|---|---|---|---|
| CN | 113624802 A | | 11/2021 |
| EP | 0785423 A1 | * | 7/1997 |

(Continued)

OTHER PUBLICATIONS

18632227_2024-06-04_JP_2000511629_A_H.pdf,Sep. 5, 2000.*

(Continued)

*Primary Examiner* — Gail Kaplan Verbitsky
(74) *Attorney, Agent, or Firm* — Stoel Rives LLP

(57) ABSTRACT

A multi-sample differential scanning calorimeter (DSC) allows for the processing samples concurrently for high-throughput sample processing. The multi-sample DSC includes a test chamber; a sample cartridge located inside the test chamber, in which the sample cartridge comprises a plurality of sample wells arranged at a periphery of the sample cartridge; a plurality of temperature sensors, in which each temperature sensor measures a respective temperature of a respective sample well; and a processor configured to selectively determine a difference in temperature between any two or more sample wells of the plurality of sample wells.

30 Claims, 24 Drawing Sheets

24 Sample Calorimeter System - Peltier Heating

(56) References Cited

U.S. PATENT DOCUMENTS

| | | |
|---|---|---|
| 7,033,840 B1 | 4/2006 | Tagge et al. |
| 7,470,057 B2 | 12/2008 | Danley |
| 8,746,967 B2 | 6/2014 | Lewis et al. |
| 9,213,008 B2 | 12/2015 | Hoult et al. |
| 9,612,168 B2 | 4/2017 | Garden et al. |
| 11,204,289 B2 | 12/2021 | Danley |
| 11,221,260 B2 | 1/2022 | Russell et al. |
| 11,474,055 B2 | 10/2022 | Russell et al. |
| 11,480,534 B2 | 10/2022 | Göpfert et al. |
| 2005/0036536 A1 | 2/2005 | Lewis |
| 2005/0036911 A1* | 2/2005 | Sellers ............... B01L 9/52 422/65 |
| 2006/0078999 A1 | 4/2006 | Bell et al. |
| 2010/0135853 A1* | 6/2010 | Broga ............... G01N 25/48 422/51 |
| 2010/0322281 A1* | 12/2010 | Lewis ............... G01K 17/00 374/34 |
| 2013/0177039 A1 | 7/2013 | Lewis et al. |
| 2014/0092935 A1* | 4/2014 | Lin ............... G01N 25/4893 374/10 |
| 2015/0127288 A1 | 5/2015 | Coursey et al. |
| 2015/0253265 A1 | 9/2015 | Whitten et al. |
| 2022/0049995 A1* | 2/2022 | Wu ............... G01N 25/482 |

FOREIGN PATENT DOCUMENTS

| | | | | |
|---|---|---|---|---|
| FR | 2326694 A1 | | 4/1977 | |
| FR | 2704948 A1 | * | 11/1994 | |
| IT | 1241776 B | | 2/1994 | |
| JP | 2000511629 A | * | 9/2000 | |
| WO | WO-9924050 A1 | * | 5/1999 | |
| WO | WO-0026651 A1 | * | 5/2000 | |
| WO | 2005001458 A2 | | 1/2005 | |
| WO | WO-2008144297 A1 | * | 11/2008 | G01K 17/00 |
| WO | WO-2022035507 A1 | * | 2/2022 | G01K 17/04 |
| WO | WO-2023178030 A1 | * | 9/2023 | G01N 25/4866 |

OTHER PUBLICATIONS

18632227_2024-06-04_WO_9924050_A1_H.pdf,May 20, 1999.*
18632227_2024-06-04_EP_0785423_A1_H.pdf,Jul. 23, 1997.*
18632227_2024-06-04_FR_2704948_A1_H.pdf,Nov. 10, 1994.*
18632227_2024-06-04_WO_0026651_A1_H.pdf,May 11, 2000.*
18632227_2024-08-15_WO_2008144297_A1_H.pdf,Nov. 27, 2008.*
18632227_2024-08-15_WO_2022035507_A1_H.pdf,Feb. 17, 2022.*
18632227_2024-08-15_WO_2023178030_A1_H.pdf,Sep. 21, 2023.*
Andersen, Dana, et al., Recombinant protein expression for therapeutic applications, Current opinion in biotechnology, 2002, vol. 13, issue 2, 5 pages.
Eskew, Mathew W., et al., DNA-based assay for calorimetric determination of protein concentrations in pure or mixed solutions, PLOS, 2024, PLOS One, 20 pages.
Eskew, Mathew W., et al., Equivalence of the Transition Heat Capacities of Proteins and DNA, Biochemical and Biophysical Research Communications, 2022, 13 pages.
Eskew, Mathew W., et al., Ligand binding constants for human serum albumin evaluated by ratiometric analysis of DSC thermograms, Analytical Biochemistry, 2021, 7 pages.
Eskew, Mathew W., et al., Ligand binding to natural and modified human serum albumin, Analytical Biochemistry, 2021, 6 pages.
Eskew, Matthew W., et al., Thermal Analysis of Protein Stability and Ligand Binding in Complex Media, Thermochimica Acta 725, 2022, 17 pages.
Hoang, H., et al., Effects of Selective Biotinylation on the Thermodynamic Stability of Human Serum Albumin, Journal of Biophysical Chemistry 7, 2016), 21 pages.
Koslen, Megan M., et al., Capture Reagent and Strategy for Retrieving Albumin-Bound Ligands from Plasma, Advances in Biological Chemistry, 2019, 29 pages.
Privalov, Themodynamic Investigations of Biological Macromolecules, In Chemical Thermodynamics, 1976, 12 pages.
Waters Corporation, Calorimetry of biological macromolecules: Theory and applications of the Nano-DSC brochure, 2019, 138 pages.
Waters Corporation, Microcalorimetry: TA Instruments RS-DSC, DSC & ITC brochure, 2024, 53 pages.
Waters Corporation, TA Instruments Microcalorimetry brochure, 2012, 55 pages.
Wingfield, Paul T., Preparation of soluble proteins from *Escherichia coli*, Current protocols in protein science, 2014, 33 pages.

* cited by examiner

24 Sample Calorimeter System – Resistance Heating

24 Sample Calorimeter System - Resistance Heating

24 Sample Calorimeter System - Resistance Heating

24 Sample Calorimeter System - Resistance Heating

24 Sample Calorimeter System - Peltier Heating

24 Sample Calorimeter System - Peltier Heating

24 Sample Calorimeter System – Peltier Heating

CONCURRENT THERMAL MEASUREMENTS OF A PLURALITY OF SAMPLES

RELATED APPLICATION

This application claims priority benefit of U.S. Provisional Patent Application No. 63/495,777, filed Apr. 13, 2023, which is hereby incorporated by reference in its entirety.

TECHNICAL FIELD

This disclosure relates generally to differential scanning calorimeters and, more particularly to, differential temperature sensing methods for comparing multiple samples in a differential scanning calorimeter.

BACKGROUND INFORMATION

Privalov and Monaselidze developed the first adiabatic scanning calorimeter for biochemical systems in 1963 and named it a differential scanning calorimeter (DSC) (Privalov, P. 1976. Thermodynamic investigations of biological macromolecules. In Chemical Thermodynamics. Elsevier, pp. 293-304.). The DSC instrumentation raises the temperature for a sample cell and a reference cell at the same rate. For samples that undergo an endothermic reaction (e.g., protein melting), the sample temperature lags behind the reference temperature due to heat being absorbed by the sample's transition. In the case of the endothermic reaction, heat is added to the sample cell in order to bring the sample temperature in agreement with the reference temperature. On the other hand, for a sample that undergoes an exothermic reaction (e.g., polymer crosslinking), the sample temperature exceeds the reference temperature. In the case of the exothermic reaction, heat is removed from the sample cell. Alternatively, instead of removing heat from the sample cell, heat can be added to a reference, thereby obviating the need to have a cooling apparatus for individual cells.

Differences in temperature detected between the sample and the reference cells are compensated using feedback heaters in order to maintain a constant temperature between the sample cells and the reference cells. The amount of energy flowing to the feedback header is a primary (or a first order) response to generate a thermodynamic response curve. The energy flux can be converted into the excess heat capacity at a constant pressure, ACp. The resulting graph of ACp versus temperature is the DSC thermogram. DSC thermograms (or sometimes referred to as "thermograms") can be used to evaluate the transition thermodynamics, including transition temperature, entropy, and enthalpy.

In some embodiments, in drug discovery and research, it is desirable to investigate how a molecule interacts with a target. The molecules and targets can be any one, or combination(s), of protein, peptide, lipid, phospholipid, nucleic acid, carbohydrate, manufactured biopharmaceutical, bacteria, virus, small organic molecules, salts, anions, cations, metal ions, chelates, or other molecules. Andersen, D. C. and Krummen, L. 2002. Recombinant protein expression for therapeutic applications. *Current opinion in biotechnology*, 13, 117-123. Wingfield, P. T. 2014. Preparation of soluble proteins from Escherichia coli. *Current protocols in protein science*, 78, 6.2. 1-6.2. 22.

In some embodiments, a first approach for investigating interactions of the target and the molecule is a structural approach, and a second approach is a functional approach. A structural approach is based on modeling how a specific molecule interacts with a target based on the three-dimensional (3D) structure of the molecules and geometries of binding sites. A functional approach evaluates the efficacy of a molecule by using the change in the biological function of a target in response to the presence of a specific molecule. The techniques for a functional approach take many forms, such as immunoprecipitation, pulldown assays, enzyme linked immunosorbent assay (ELISA), fluorescence, and other forms.

In general, the structural approaches and functional approaches can be useful, but these approaches have some drawbacks. For example, the structural approaches rely on models for the initial screening of molecules. Consequently, relying solely on structure leads to considerable false-negatives and false-positives for advancing specific molecules for further study. As another example, the functional approaches need to be highly specific for a molecule and target, which makes screening expensive and time consuming.

An alternative approach is offered by DSC that focuses on thermodynamic responses. A strength of focusing on thermodynamic responses is that no specific knowledge of structure or function is required for investigation. In addition, the thermodynamic response method is label free (e.g., probes, tags, etc.). DSC has been used for a considerable number of years to evaluate target-ligand interactions. The evaluation of the target-ligand interactions has been accomplished using precise calorimeters that use thermograms to extract thermodynamic information regarding the target-ligand interactions. Such precision is important, because the characteristics of the measured thermogram are analyzed to derive values of transition melting temperature and calorimetric, for example, thermodynamic quantities. Even with this precision, differences in methods to extract thermodynamic values and natural variability have limited the ability of DSC to serve as a quantitative tool. Moreover, current instrumentation suffers from a low throughput, further limiting applications of DSC and thermodynamic approaches.

SUMMARY OF THE DISCLOSURE

The present inventors have recently reported that relative thermodynamic responses generated by DSC can be used as a generic "response" signal. (Eskew, M. W., Reardon, P., and Benight, A. S. 2024. DNA-based assay for calorimetric determination of protein concentrations in pure or mixed solutions. PLOS One. 19 (3). Eskew, M. W., and Benight, A. S. 2022. Equivalence of the transition heat capacities of proteins and DNA. *Biochemical and Biophysical Research Communications*. 597:98-101. Eskew, M. W., and Benight, A. S. 2021. Ligand binding constants for human serum albumin evaluated by ratiometric analysis of DSC thermograms. *Analytical Biochemistry*. 628:114293. Eskew, M. W., and Benight, A. S. 2022. Thermal analysis of protein stability and ligand binding in complex media. *Thermochimica Acta*. 715:179274.)

Specifically, relative changes to a thermogram in response to varied ligand concentrations allow for a ratiometric evaluation of ligand binding to a target that results in quantitative binding information. Fundamentally, ratiometric evaluation does not require optimization of the overall precision of conventional thermogram methods. It has been shown that ratiometric evaluation of DSC thermograms is suitable to quantitatively evaluate ligand binding (e.g., dissociation) constants, semi-quantitative binding stoichiometry, and qualitative thermodynamic parameters. Utilizing the same fundamental concepts of the ratiometric approach used for ligand binding, it is possible to analyze the concentration of a molecule in solution and detect binding in solutions containing multiple species.

The thermodynamic responses used in the ratiometric approach are robust, since they are the result of interaction in the system. Differently stated, absent of an interaction there would be no changes. This allows for an added dimension, where the fundamental thermodynamic responses can be categorized and collected into a library for molecules and targets. In a specific example, it was shown in the *Analytical Biochemistry* paper that two different molecules, with significant structural differences, but containing a unique functional group resulted in identical binding constants to a protein.

Currently, there are a number of conventional instruments that are capable of employing a ratiometric evaluation of DSC thermograms (e.g., a ratiometric approach). The conventional instruments used in the ratiometric approach, however, still attempt to optimize precision. Consequently, ratiometric approaches do not provide an adequate throughput that can be capable of placing DSC as a viable tool for wide adoption. An instrument capable of high-throughput thermodynamic response screening of molecules and targets can significantly increase the accuracy of early screening efforts and reduce research costs.

The present inventors have recognized that the prior emphasis on precision has come at the cost of scalability (e.g., high-throughput applications) and difficulties in sample handling (e.g., microfluidics). Instrumentation that is capable of parallel sample handling and removable cells are limited to low precision instrumentation that is not suitable for handling biological samples. Accordingly, this disclosure describes a high-throughput modular instrument with optimized precision. The high-throughput modular instrument described herein thereby allows for ratiometric analysis of biological samples.

Embodiments of the present disclosure describe an instrument that measures binding interactions between a target and a ligand. In some embodiments, the target can include a protein, a peptide, a lipid, a phospholipid, a nucleic acid, a carbohydrate, a manufactured biopharmaceutical, a bacterium, a virus, or another type of target. In some embodiments, the ligand can include a protein, a peptide, a nucleic acid, a lipid, a phospholipid, a carbohydrate, generated biologics, a small molecule, a salt, an anion, a cation, a metal ion, a chelate, or another type of ligand.

In some embodiments, the disclosed instrument can detect the binding interaction(s) between the target and the ligand and can report the strength of the binding interaction(s); an association or a disassociation constant; a binding stoichiometry; and a relative thermodynamic contribution(s) of the binding interaction(s). In some examples, one or more relative peak heights of the generated curves using the disclosed instrument are used to evaluate the mass of a target molecule in a pure or a complex sample.

A scientist, a technician, a researcher, or a medical professional can use the disclosed instrument to streamline the processing of a large number of DSC samples. To do so, the disclosed instrument includes a sample cartridge with a plurality of sample wells (or cells). Sample cartridge refers to a flat or shallow container of sample wells that can be easily replaced with another similar part, for use in a DSC. Sample well refers to an indention or receptacle in the sample cartridge for storing a test sample.

In one embodiment, the sample cartridge is a circular disk, where the circular disk minimizes the effects of temperature gradients within a furnace (or test chamber) of the instrument. In another embodiment, the sample cartridge is a rectangular plate consistent in size and shape with a standard 96-well plate format. In yet another embodiment, the sample cartridge is constructed using mass-production methods, such as those found in the manufacture of printed circuit boards (PCBs).

In some embodiments, the disclosed instrument uses interchangeable and modular sample wells that mechanically (e.g., non-permanently) confront sensors and contact heating elements that allow for parallel and high-throughput processing. The interchangeable and modular sample wells of the instrument provide a sterile (or near sterile) work environment. The interchangeable and modular sample wells of the instrument allow for preloading and working of samples before the sample cartridge is loaded into the instrument.

In some embodiments, the disclosed instrument includes sensors and supporting circuitry thereof, in which the output of the sensors varies with temperature. In one embodiment, the sensor and the supporting circuitry thereof generate a frequency that is temperature dependent. In another embodiment, the temperature dependence is linear. In another embodiment, the temperature dependence is monotonic. In another embodiment, the disclosed instrument uses a crystal oscillator with a large monotonic temperature coefficient. In another embodiment, the disclosed instrument uses a tuning fork temperature sensor, such as a micro electronic mechanical systems (MEMS) tuning fork temperature sensor. In another embodiment, the disclosed instrument uses a discrete thermistor, a resistance temperature detector (RTD), or an equivalent thereof (e.g., a discrete resistive element). In yet another embodiment, the disclosed instrument includes circuitry to convert changes in physical properties (e.g., resistance), which are caused by changes in temperature, into changes in frequency.

In some embodiments, the disclosed instrument includes gold-, platinum-, or other heat-conducting metal-plated sample wells. In one embodiment, for larger volume samples, a gold-plated sample well is soldered or press-fit to the sample cartridge using standard pick-and-place manufacturing techniques. In another embodiment, for smaller volume samples, gold-plated detents are built into the sample cartridge using conventional PCB manufacturing techniques. In another embodiment, gold is sputtered onto that part of the well that comes into contact with the aqueous sample. Thus, the sample well can be constructed of disparate parts, such as thin-walled tubing soldered to a fiberglass sample cartridge with a board-mounted temperature senor. The parts can also be coated with a thin layer of gold that makes the assembled sample well inert to the sample (e.g., the aqueous sample).

In some embodiments, electrical signal connectivity to the disclosed instrumentation is external to a surface of the instrumentation (e.g., the electrical signal connectivity is not embedded in, or a part of, the instrumentation). In one embodiment, all sensing is done external to the sample disk with robust or repeatable thermal connectivity between heaters and samples and between samples and sensors. In another embodiment, temperature measurements are converted to digital data. For example, the digital data are square waves that are not affected, or are little affected, by small variations in electrical signal connectivity. In another embodiment, the disclosed instrumentation can include, or utilize, gold-plated "pogo pins" that are built into, but electrically isolated from, the furnace. By so doing, the disclosed instrumentation eliminates, or reduces, data degradation that may be caused by poor electrical signal connectivity, which have a large impact on low-level electrical signals. In another embodiment, electronic circuitry (e.g., disk-mounted electronics, a processor) aggregate the data from one or more samples. For example, the electronic circuitry includes a counter that integrates the frequency of the sample(s) over time. In some embodiments, the integration time is increased to improve the resolution of the temperature measurement. In some embodiments, by using counters, the disclosed instrumentation uses fewer physical connections. In one embodiment, the physical connections include power, ground, and bi-directional data, where the data are temperature sensor measurements in a first direction; and heater output-commands in a second direction.

In some embodiments, an identification (ID) integral to, or included in, the sample disk is traceable to calibration data that are unique to each sample well. For example, the calibration data is generated as part of the sample cartridge manufacturing process. As another example, the calibration data is part of a pre-test calibration procedure. The ID can be a serial number (or an equivalent thereof); a machine readable tag, such as barcode, a quick response (QR) code, a radio-frequency identification (RFID) tag or code, or combinations thereof.

In some embodiments, the disclosed instrumentation uses data that express a relation of frequency versus time. The frequency-versus-time data can be the furnace ramp temperature and/or the temperature of each well. In one embodiment, the data includes raw frequency data. In another embodiment, the data are converted to temperature data by using calibration data. In another embodiment, frequency data are corrected based on the calibration data to generate an accurate reading of the temperature. In another embodiment, the data includes differential temperature data between two sample wells (e.g., a beat frequency that results from mixing two frequencies). In yet another embodiment, the data includes processed data, such as averaging of multiple replicates; statistics showing variability when comparing replicates; trend data for one or more reference wells over time; other types of processed data; or combinations thereof.

The present disclosure includes one or more methods for adding energy tailored to each test well. In one embodiment, the method includes using individually actuatable heaters proximal to each test well. These heaters can be used to inject the differential heat to bring each well into equilibrium with a reference, or to inject a combination of the ramp heat and the differential heat. In one embodiment, the heaters are integral to the sample cartridge. In some examples, the heaters are built into the sample chamber, and the heater makes thermal contact with each sample well during a test. Additionally, or alternatively, the heaters include resistive elements that are integral to the sample cartridge (e.g., as traces on a PCB). Additionally, or alternatively, the heaters are thermoelectric effect devices employing the Peltier effect.

In some embodiments, the disclosed instrumentation includes, or utilizes, a processor that generates energy pulses, such as pulse-width modulation (PWM) energy pulses. In some embodiments, the process is configured to distribute the energy pulses sequentially to each sample well. In some embodiments, the processor is integrated in the disclosed instrumentation, or is integrated into each sample disc. By integrating the processor into each sample cartridge, the count (or the number) of connections between the instrumentation and the sample cartridge is reduced.

In some embodiments, the disclosed instrument includes, or utilizes, memory/storage device(s), a database, or some other storage device. The processor is configured to log or track the temperature between any two or more sample wells or each sample well. The logged or tracked data can be stored on the memory/storage device(s) or the database.

In one embodiment, test points are built into the sample cartridge to calibrate the resistance of each heating element as part of a comprehensive calibration protocol. The calibration removes (or reduces) variations between the heating elements. By so doing, the calibration removes (or reduces) sample-to-sample temperature variations that are not attributable to the sample under test (e.g., the sample being tested). This calibration can be done as part of the disk manufacturing process, where the calibration data are encoded onto the disk; as part of a calibration routine prior to a sample run; or a combination thereof.

In some embodiments, the disclosed instrumentation includes an interference fit thermal contact between each test well and its corresponding sensor. In one embodiment, the temperature sensors abut each sample well. In another embodiment, gold-plated via(s) thermally conduct heat between the test well and its corresponding disk-mounted sensor. In another embodiment, the temperature sensor is immersed in each sample well and is in contact with the sample fluid. In yet another embodiment, the sensors are built into the test chamber, and the sensors make repeatable, or continuous, thermal contact with each sample well.

In one embodiment, the sample cartridge may be a disposable sample disk (e.g., that can be used one time, or a limited count of times). In one embodiment, the sample cartridge is a re-usable sample cartridge, and the user can clean the sample cartridge between test runs. In one embodiment, the disclosed instrumentation utilizes various cleaning tools that are readily available in a laboratory environment.

In some embodiments, the disclosed instrumentation uses a controlled distribution of pressure to ensure that the samples do not undergo a phase change during a test (e.g., aqueous solution boiling as the DSC temperature ramps above 100 degrees Celsius, 100° C.). In one embodiment, the pressure remains common and constant pressure for all the samples. In another embodiment, a manifold is used to distribute the pressure to each sample to minimize the volume under pressure. In another embodiment, the manifold includes a plurality of plenums, where a count of the plenums is equal to a count of the sample wells (or sample cups). In another embodiment, the pressure is distributed using the manifold and the plenums. By so doing, the disclosed instrumentation can selectively provide different pressures to different samples. In some embodiments, the disclosed instrumentation can selectively vary the pressure during a test.

Additional aspects and advantages will be apparent from the following detailed description of embodiments, which proceeds with reference to the accompanying drawings.

BRIEF DESCRIPTION OF THE DRAWING FIGURES

To easily identify the discussion of any particular element or act, the most significant digit or digits in a reference number refer to the figure number in which that element is first introduced.

DETAILED DESCRIPTION OF EMBODIMENTS

The prior art DSCs (e.g., DSC 100 of FIG. 1) include at least two classes of DSCs: a first class of the DSCs designed for biological samples; and a second class of the DSCs designed for non-biological samples or materials, such as polymers, metals, solid-state compounds, or other materials. The prior art DSCs designed for biological samples have undergone changes since initial conception, and advances of these DSCs have been primarily driven by advances in electronic circuitry, microcontrollers, and material choices.

Figure 1:
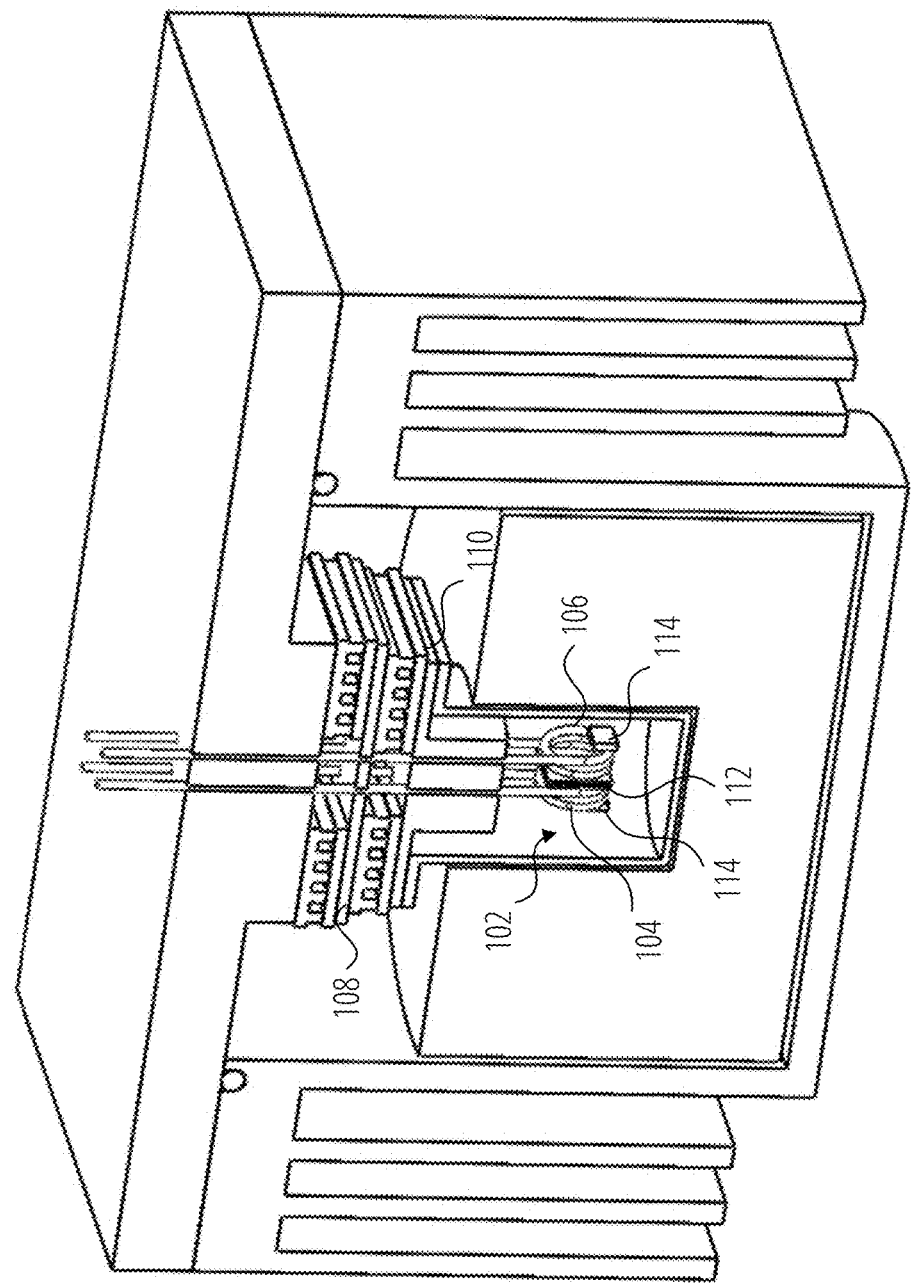
FIG. 1 is a sectional, isometric view of a DSC, according to the prior art.

FIG. 1 shows a cross-sectional view of DSC 100 designed for biological samples. In some embodiments, DSC 100 includes a furnace 102, a sample cell 104, a reference cell 106, a main heater 108, a supplemental heater 110, and a feedback heater 112. To achieve high levels of precision, temperature probes 114 and feedback heater 112 for both sample cell 104 and reference cell 106 are directly soldered to the cells to attempt to maximize heat transfer and minimize environmental losses. While DSC 100 design attempts to achieve high precision, DSC 100 design constrains instrument scalability and limits the instruments to serial processing, i.e., one sample at a time.

In some embodiments, sample cell 104 and reference cell 106 are subject to a steady ramp in temperature inside furnace 102. As furnace 102 reaches a temperature that triggers a state change in sample cell 104, an endothermic (or exothermic) reaction is detected as a difference in temperature between sample cell 104 and reference cell 106 (i.e., reference cell 106 does not experience a state change). DSC 100 uses a bridge circuit to detect the differential temperature between sample cell 104 and reference cell 106. The differential signals used to detect the differential temperature are considerably small, which is a challenge for DSC 100.

DSC 100 is configured to inject energy in order to bring the temperature of sample cell 104 into equilibrium with reference cell 106, for example, by using feedback heater 112 separating the two test wells. The energy injected into sample cell 104 as a function of the temperature of furnace 102 is a signature that can be used to calculate enthalpy and other physical traits of sample cell 104.

In some embodiment, cross-contamination between sequential tests is an additional source of error that requires thorough cleaning and re-calibration between the tests. The cleaning and the re-calibration further diminish the throughput of DSC 100.

Although multiple variations of the described approach that are used to characterize chemical compounds have been developed, the fundamental approach has remained relatively unchanged since the 1940s and has limitations. As an example, the sample cells (e.g., sample cell 104) need to be carefully calibrated to minimize their differences. As another example limitation, the temperature sensors need to be carefully calibrated to achieve the desired sensitivity. As another example limitation, thermal connections need to be well characterized and repeatable. As another example limitation, electrical connections for low-level signals need to be stable. As yet another example limitation, the sample cells (e.g., sample cell 104) need to be carefully cleaned between test runs to minimize (or lower) cross-contamination. In some embodiments, these limitations can deter or prevent the following: electrical connections of low-level signals; low-cost single-use test wells with undefined thermal conductivity; processing multiple samples simultaneously; processing replicate samples to minimize errors; cross-correlating the results of multiple samples; using low-level trained personnel; or a combination thereof.

In some embodiments, these limitations include low-throughput instrumentations that are susceptible to user error. DSCs (e.g., DSC 100) are highly sensitive to the mass of a sample (e.g., sample cell 104) in the DSC, which can vary by approximately minus two to plus two percent (±2%)

simply from using a calibrated pipette. Therefore, even before taking into account errors of DSC 100, there can be a ±2% error solely from sample preparation. Furthermore, many samples (e.g., a sample inside sample cell 104) display variable stabilities over time (e.g., the sample inside sample cell 104 may degrade over time) when serial processing, which can last approximately two hours run time plus 30 minutes of cleaning time. For example, lysozyme is a protein that is stable at −80° C. but quickly degrades in solution. Therefore, when using DSC 100, new solutions of lysozyme are needed for each experiment. Unfortunately, the errors associated with each solution are compounded.

Note that insufficient cleaning of sample cell 104 may also leave residual material, thereby skewing subsequent results. Some types of DSCs for non-biological materials employ removable, single-use pans that do not require cleaning. These pans, however, need to undergo extensive calibration before performing an experiment due to the variability of thermal contact between the removable cells and temperature sensors. This results in low sensitivity that is unsuitable for biological samples or other low-signal samples.

Even with the removable cells, these instruments are still limited to serial processing due to the inability to get the necessary sensitivity due to errors introduced by the bridge circuits. For instance, previous attempts to process multiple samples (e.g., multiple sample cells 104) against a single reference sample (e.g., reference cell 106) have failed, because the bridge circuits need to be switched, and the switches themselves introduce additional errors.

Some other previous attempts use an array of sample cells that are prepared outside a furnace and then placed into instrumented receptacles. These attempts also introduce excessive variability in the thermal contact of the removable test cells, thereby making characterization difficult.

Using current (prior art) DSCs include additional limitations. For example, DSCs furnaces (or test chambers) with large thermal mass take a significantly longer time to cool down between runs. As another example, calibration runs double the run time and reduce throughput by a factor of two.

Other attempts to introduce the temperature sensors directly into each sample have contributed to cross-contamination and have required careful complex and time-consuming cleaning steps.

Figure 2:
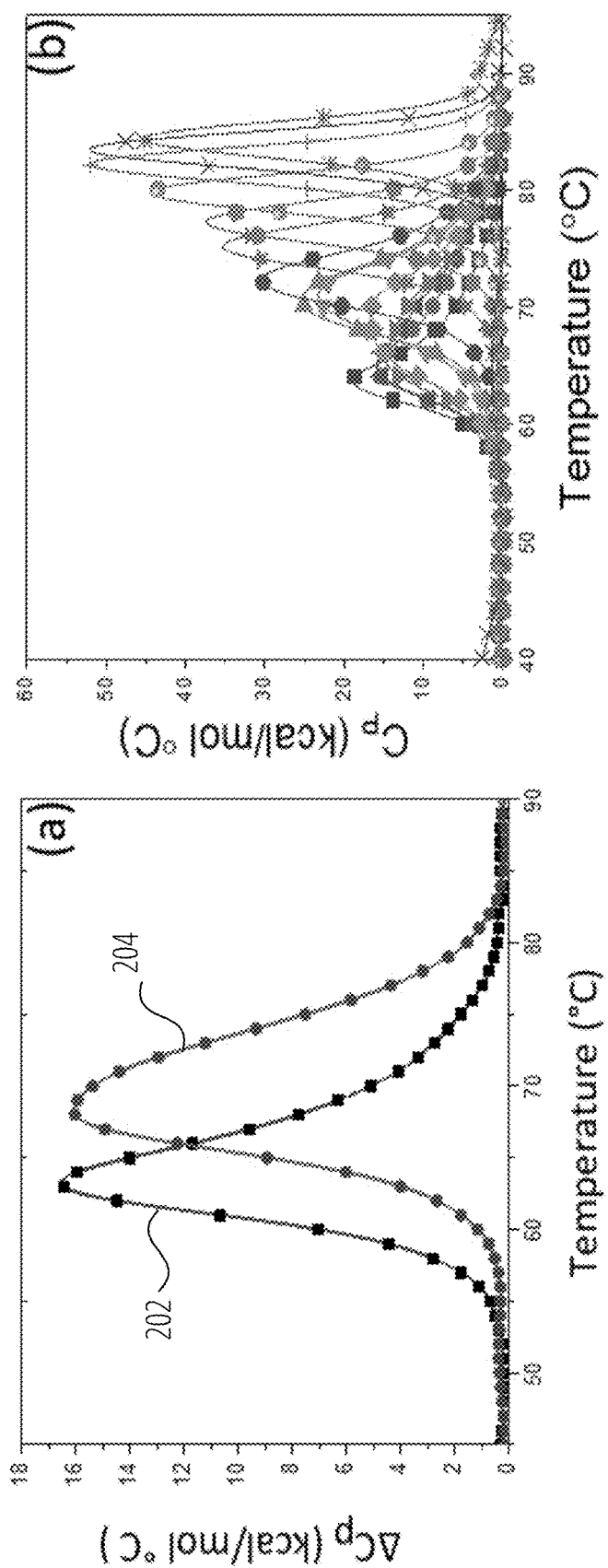
FIG. 2 are graphs of DSC data in accordance with one embodiment.

FIG. 2 shows a specific example of the time savings from the disclosed, high-throughput instrument. Displayed data are from Eskew, M. W., and Benight A. S. In the *Analytical Biochemistry* paper. In the right-side (a) graph, two curves are shown. A first curve 202 represents the thermogram of a protein alone, in this case it is human serum albumin (HSA). A second curve 204 is the thermogram of HSA in the presence of a quantity of drug. The time requirement for collection of this data using, e.g., DSC 100 (FIG. 1), requires a minimum of four hours, with additional time for cleaning.

A left-side (b) graph of FIG. 2 shows a completed data set for a specific drug comprised of an eleven-sample experiment collected in duplicate. Collecting this data required 44 hours of instrument running time plus a minimum of 30 minutes cleaning time between each of the 22 experiments, for a total of at least 55 hours.

In contrast, the present inventors have developed techniques for implementing a robust DSC capable of rapidly and accurately processing in parallel a plurality of samples (including replicates), while minimizing calibration and maintenance or employing highly-skilled users. For the high-throughput embodiments described below, the data from all 22 experiments could be collected in a single two-hour period. The speed and ease of use of the described embodiments greatly increases the applicability of DSC technologies.

Figure 3:
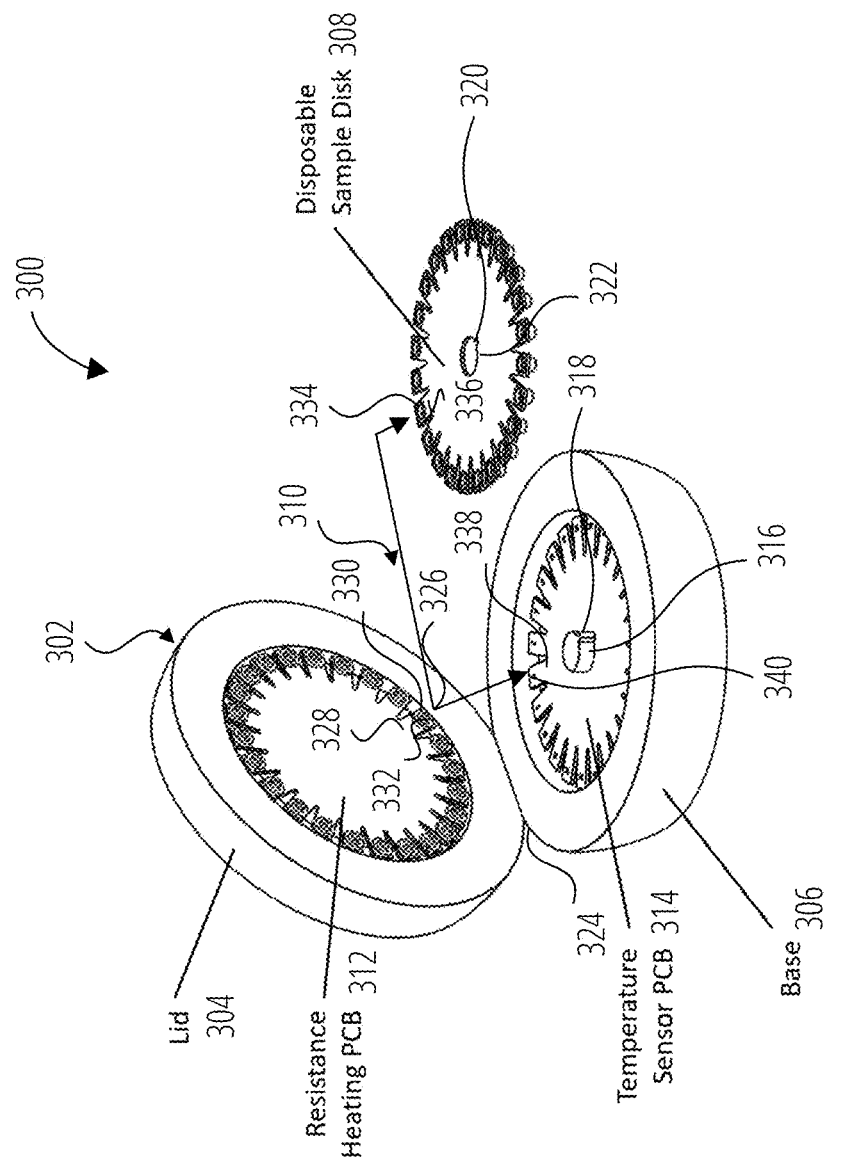
FIG. 3 is an isometric view of a multi-sample DSC, according to one embodiment.

FIG. 3 shows a multi-sample DSC 300 that uses resistance heating for its heating instrument. Multi-sample DSC 300 has a set of 24 available sample positions, although any subset may be employed for a given test. And other variants may include fewer or more than 24 available sample positions.

As is shown in FIG. 3, multi-sample DSC 300 includes a non-thermally conductive body 302 having a lid 304 that opens away from a base 306 so as to receive a disposable sample cartridge 308 (or a re-usable sample cartridge) into a test chamber 310. An inner panel of lid 304 houses resistance heating PCB 312 that forms a top of test chamber 310. Likewise, an inner panel of base 306 houses a temperature sensor PCB 314 that forms a bottom of test chamber 310. A central guide stem 316 extends upwardly through temperature sensor PCB 314 and has a key 318 for guiding a keyway 320 in a central aperture 322 of disposable sample cartridge 308. Thus, disposable sample cartridge 308 can be guided into position in test chamber 310, between resistance heating PCB 312 and temperature sensor PCB 314 when a hinge 324 is used to close lid 304.

In the example of multi-sample DSC 300, each of test chamber 310, disposable sample cartridge 308, resistance heating PCB 312, and temperature sensor PCB 314 form an azimuthally symmetrical system to reduce heat gradients inside test chamber 310. In other embodiments, which are less sensitive to thermal gradients, or the thermal gradients are negligible (e.g., testing performed using slower temperature ramp rates), these components may form a square or rectangular shape.

Members of functional sampling group 326 are mutually angularly and radially spaced apart from each other when lid 304 is closed, for example, at a periphery of a sample cartridge. In some embodiments, the 24 available sample positions are functionally identical. Accordingly, one or more of the functional sampling groups may act as a reference cell for comparative analysis with one or more sample cells, e.g., in one-to-one comparisons or many-to-one comparisons. For conciseness, the following passages describe one functional sampling group 326 of the 24 available sample positions. Skilled persons will now appreciate, however, that all the functional sampling groups are alike, and other arrangements are possible (e.g., arranged in a manner equidistant from each other, such as a radially or close-packing arrangements).

At its upper portion, functional sampling group 326 includes a peripheral finger 328 radially extending from a center of resistance heating PCB 312. Peripheral finger 328 provides a mounting location for a resistive heater 330 and an optional pressure nozzle 332 (extending from a pressure manifold, described later). In this example, resistive heater 330 is concentric with optional pressure nozzle 332, and resistive heater 330 is designed to transfer heat to the flange of each sample well 334.

A class of samples that are a focus of this disclosure include dilute water-based compounds (e.g., 99.8% water and 0.2% protein). Gas in sample well 334 (and a reference cell) degrade the desired measurements. For temperature scans that span 100° C. (e.g., the nominal boiling temperature of water), suppression of the phase change from liquid to gas may be desired. The suppression of the phase change is achieved by imposing an ambient pressure of three to four atmospheres (e.g., 45 to 60 pound per square inch, PSI) in sample well 334 and its reference cell. Thus, optional pressure nozzle 332 is sized to sealably mate with an aperture of a corresponding sample well 334 (or sample cup) to form a closed pressurized chamber. Similar to peripheral finger 328 of resistance heating PCB 312, sample well 334 of disposable sample cartridge 308 is disposed through an aperture of a peripheral finger 336 radially extending away from central aperture 322. Each sample well 334, therefore, is integrally formed in (e.g., press fit or soldered) disposable sample cartridge 308.

Finally, at its lower portion, functional sampling group 326 includes a peripheral finger 338 atop which is mounted a temperature sensor 340, so that temperature sensor 340 firmly makes mechanical and thermal contact with a bottom outer side (or other thermally conductive surface) of sample well 334. For instance, peripheral finger 338 may be designed with an interference fit, such that peripheral finger 338 flexes against the bottom side of sample well 334, thereby ensuring firm mechanical compliance and good thermal contact for accurate temperature sensing. Likewise, peripheral finger 328 of resistance heating PCB 312 can also be designed with an interference fit and flexes to ensure good thermal contact for repeatable heating.

Temperature sensor 340 may be a temperature sensing crystal oscillator (TSXO), a negative temperature coefficient (NTC) thermistor, an RTD, a thermocouple, a semiconductor-based temperature sensor, a MEMS-type sensor, or another type of temperature sensor.

Since base 306 and lid 304 are coupled using hinge 324, each resistive heater 330 of resistance heating PCB 312 is spatially aligned (or correlated) to a corresponding (or a respective) temperature sensor of temperature sensor PCB 314, whether lid 304 is open or closed.

In some embodiments, each temperature sensor of the temperature sensor PCB 314 measures the temperature of each sample well 334. In some embodiments, if the temperature needs to be increased, each resistive heater 330 increases the temperature, in a pre-determined temperature ramp, of a respective sample well to match a pre-determined target temperature.

Central portions of disposable sample cartridge 308, resistance heating PCB 312, and temperature sensor PCB 314 are typically not thermally conductive. Thus, heat is delivered directly to sample wells. Also, in some embodiments, disposable sample cartridge 308 is thermally isolated. The thermal isolation lowers thermal losses of a sample inside sample wells 334 during a sample run.

Calibration of both the temperature sensor (e.g., temperature sensor 340) characteristics and the heater (e.g., resistance heating, Peltier heating) characteristics can be done as part of the manufacturing of disposable sample cartridge 308. This information can be encoded into a QR code, some other unique ID code, or onto a processor on disposable sample cartridge 308. By so doing, the user need not perform these calibrations, thereby reducing processing time, reducing operational costs, and reducing errors. In some embodiments, disposable sample cartridge 308 may be cleaned and reused (rather than disposed of).

Figure 4:
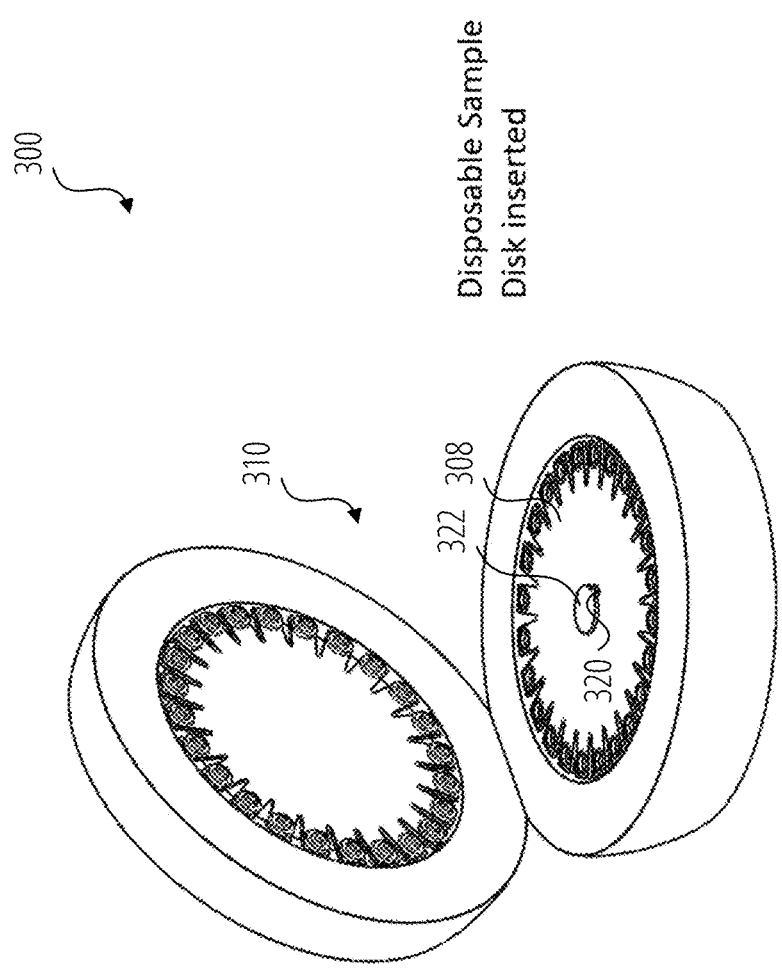
FIG. 4 is another isometric view of the multi-sample DSC of FIG. 3 showing a disposable sample cartridge in its inserted position, in accordance with one embodiment.
Figure 5:
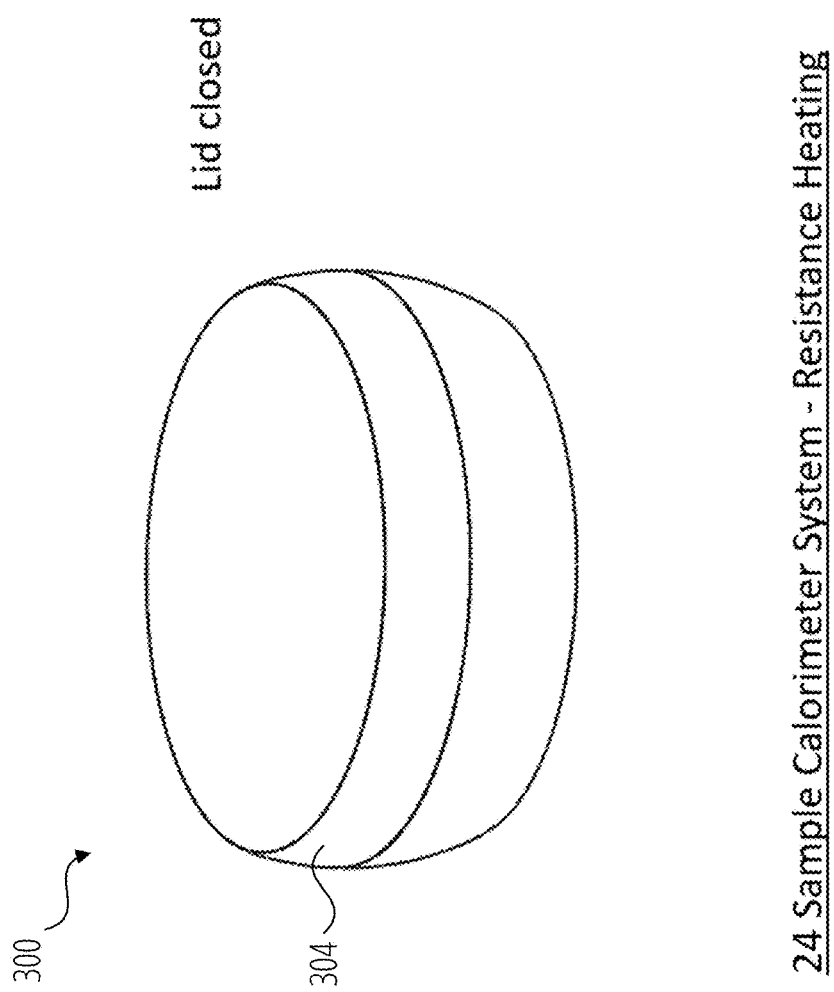
FIG. 5 is another isometric view of the multi-sample DSC of FIG. 3 showing its lid closed, in accordance with one embodiment.
Figure 6:
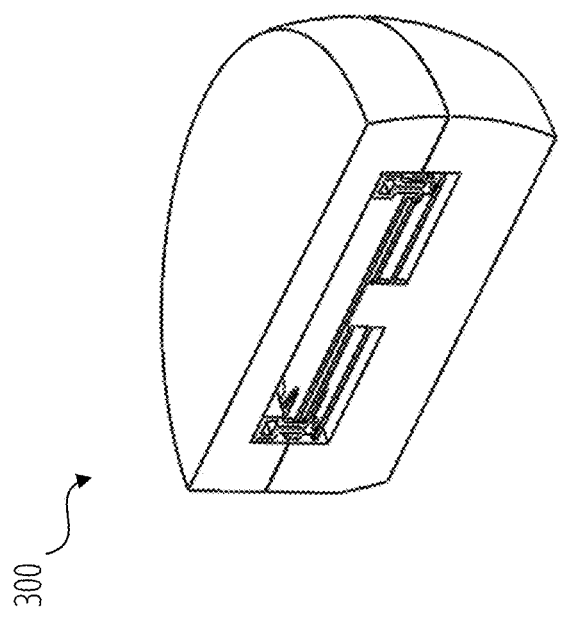
FIG. 6 is a cross-sectional view of the multi-sample DSC shown in FIG. 5.

FIG. 4 shows multi-sample DSC 300 with disposable sample cartridge 308 inserted in test chamber 310. As explained above, keyway 320 and central aperture 322 are guided by, respectively, key 318 of central guide stem 316. This ensures alignment of fingers for sample wells with corresponding fingers for temperature sensors.

Next, FIG. 5-FIG. 8 show lid 304 closed. This seals test chamber 310 (FIG. 3) and, in effect, delivers heaters into contact with corresponding metallic (or otherwise thermally conductive) sample wells. For devices that employ pressure, and with reference to FIG. 7, closing lid 304 also mates optional pressure nozzles 332 into corresponding sample wells 334. This effectively creates a pressure zone 702 inside sample well 334, rather than pressurizing the entire test chamber 310. Other embodiments, however, may pressurize the entire test chamber 310.

Figure 7:
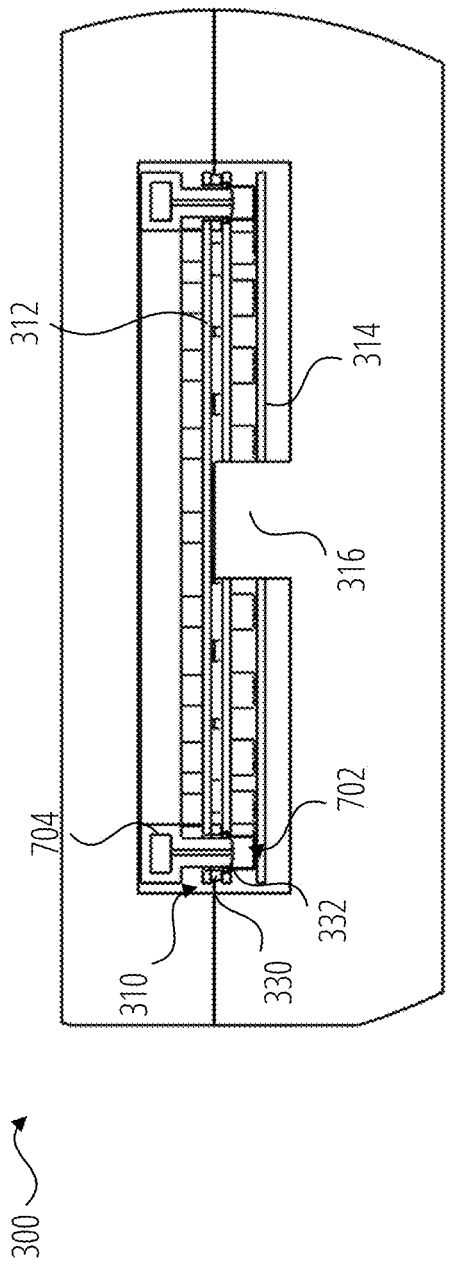
FIG. 7 is a side elevation view of the cross-section shown in FIG. 6.
Figure 8:
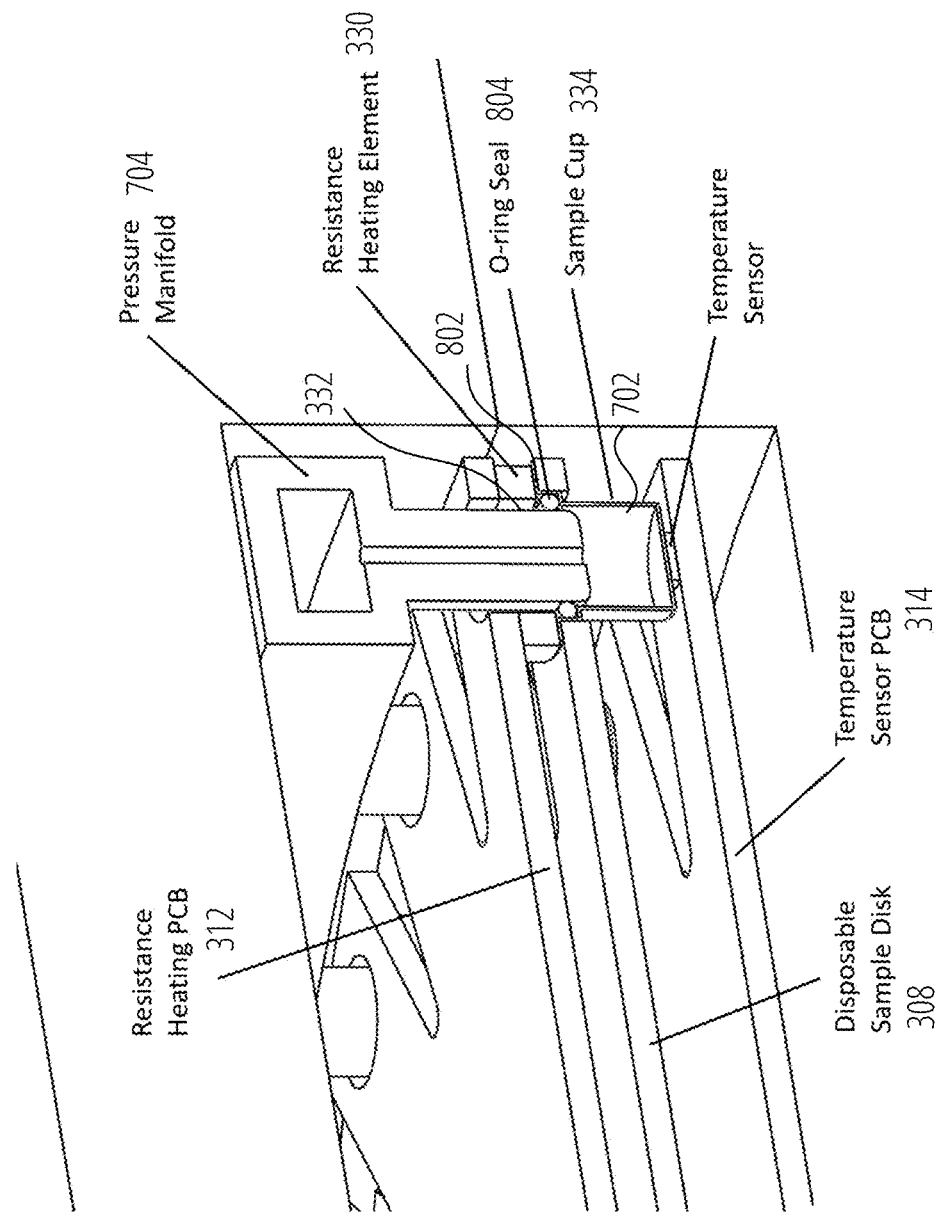
FIG. 8 is a fragmentary detail view of the cross-section of FIG. 6 showing internal components in greater detail.

FIG. 7 and FIG. 8 also show details of a pressure manifold 704 through which positive (or negative) pressure is delivered to each pressure zone 702. In some embodiments, pressure manifold 704 includes a duct that forms an annulus, from which a tap extends into each pressure zone 702. In other embodiments, different pressurized sections of duct may be applied to different subsets of sample wells. For instance, a first quadrant may receive a first pressure, a second quadrant may receive a second pressure that is different from the first pressure, and so forth. In yet other embodiments, each sample well receives a unique pressure.

FIG. 8 shows in greater detail how resistive heaters 330 wrap around optional pressure nozzle 332 and thermally contact an upper surface 802 of sample well 334. An o-ring seal 804 surrounds the opening of sample well 334 to create pressure zone 702 when optional pressure nozzle 332 is inserted and applies pressure.

Skilled persons will appreciate in light of FIG. 3-FIG. 8, that other numbers of samples can be accommodated. For example, disposable sample cartridge 308, resistance heating PCB 312, temperature sensor PCB 314, and pressure manifold 704 can be swapped out from non-thermally conductive body 302 and replaced with components having a different number or size of sample wells (e.g., modular sample kits). For instance, kits may have various sizes and volumes that are plug-and-play. An example is the 24 wells of 0.5 mL in the figures, or 12 wells of 1 mL (not shown), and the like.

Figure 9:
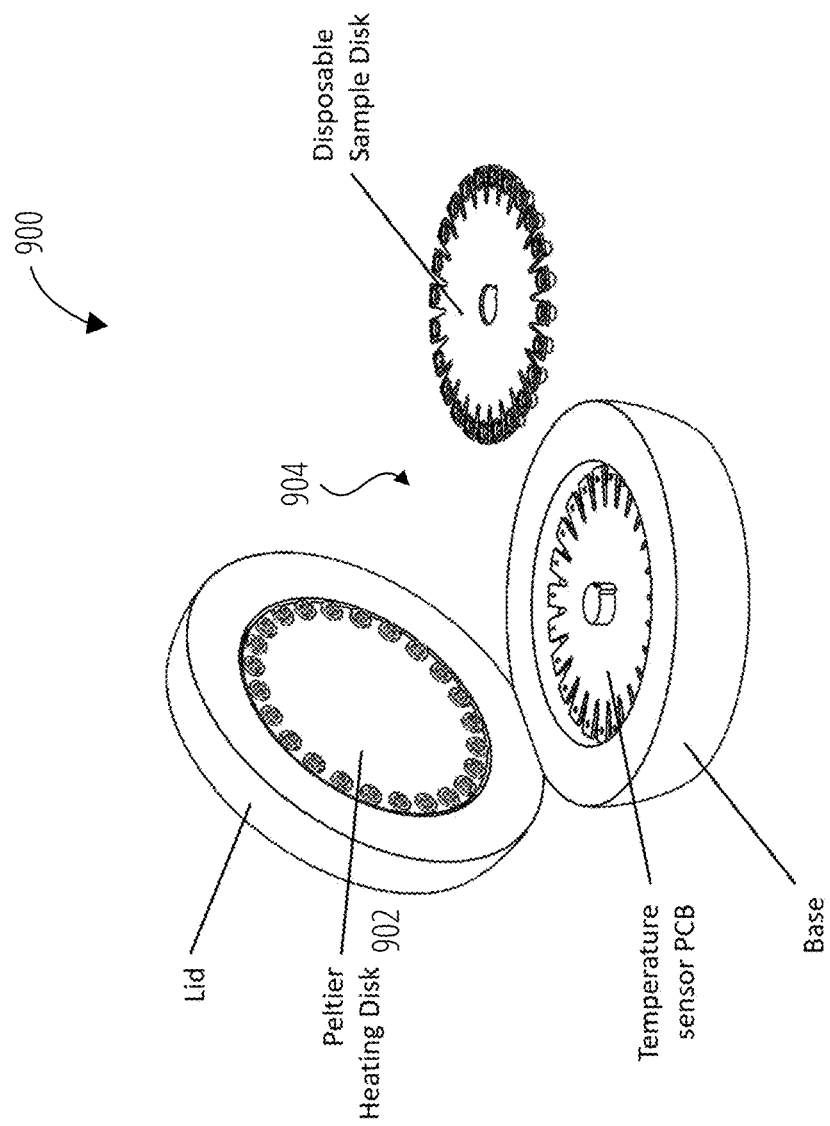
FIG. 9 is an isometric view of a multi-sample DSC, according to another embodiment.
Figure 10:
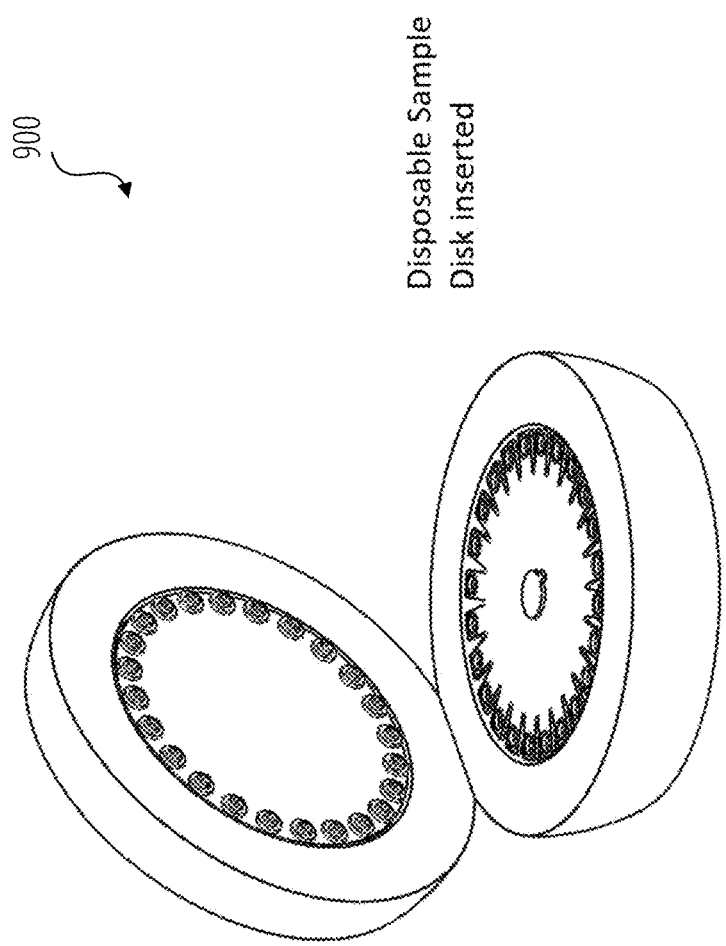
FIG. 10 is another isometric view of the multi-sample DSC of FIG. 9 showing a disposable sample cartridge in its inserted position, in accordance with one embodiment.
Figure 11:
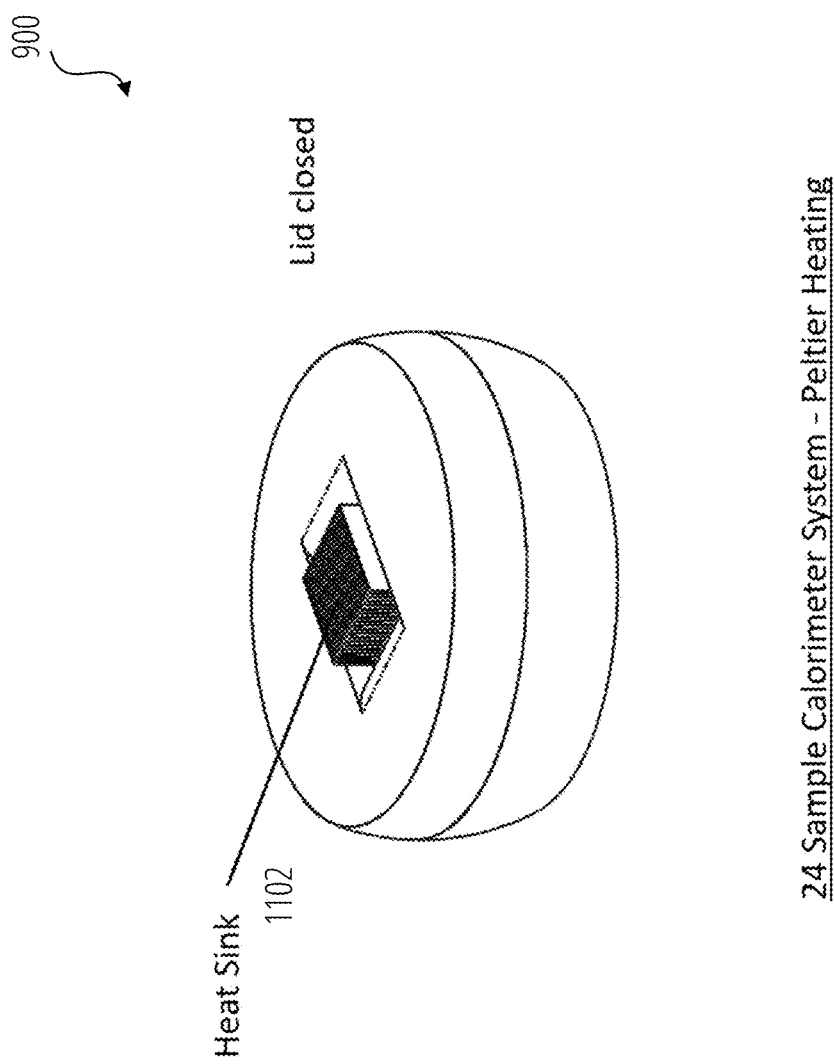
FIG. 11 is another isometric view of the multi-sample DSC of FIG. 9 showing its lid closed, in accordance with one embodiment.
Figure 12:
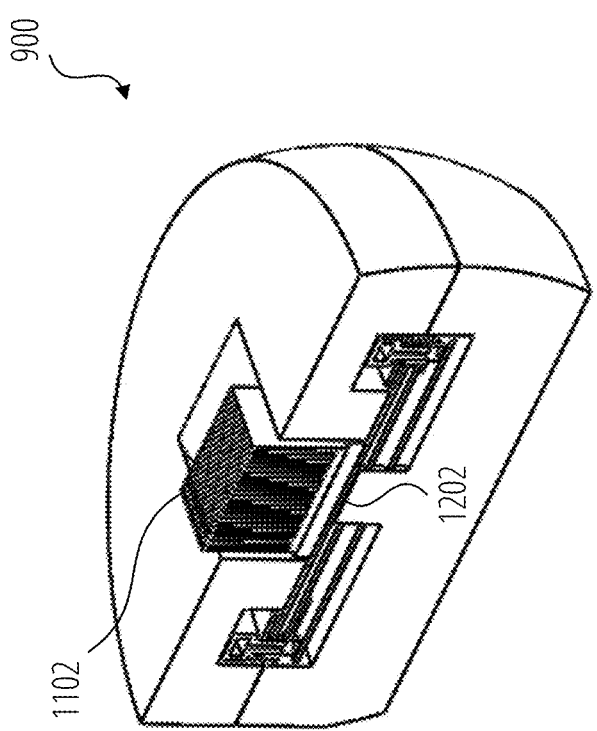
FIG. 12 is a cross-sectional view of the multi-sample DSC shown in FIG. 11.
Figure 13:
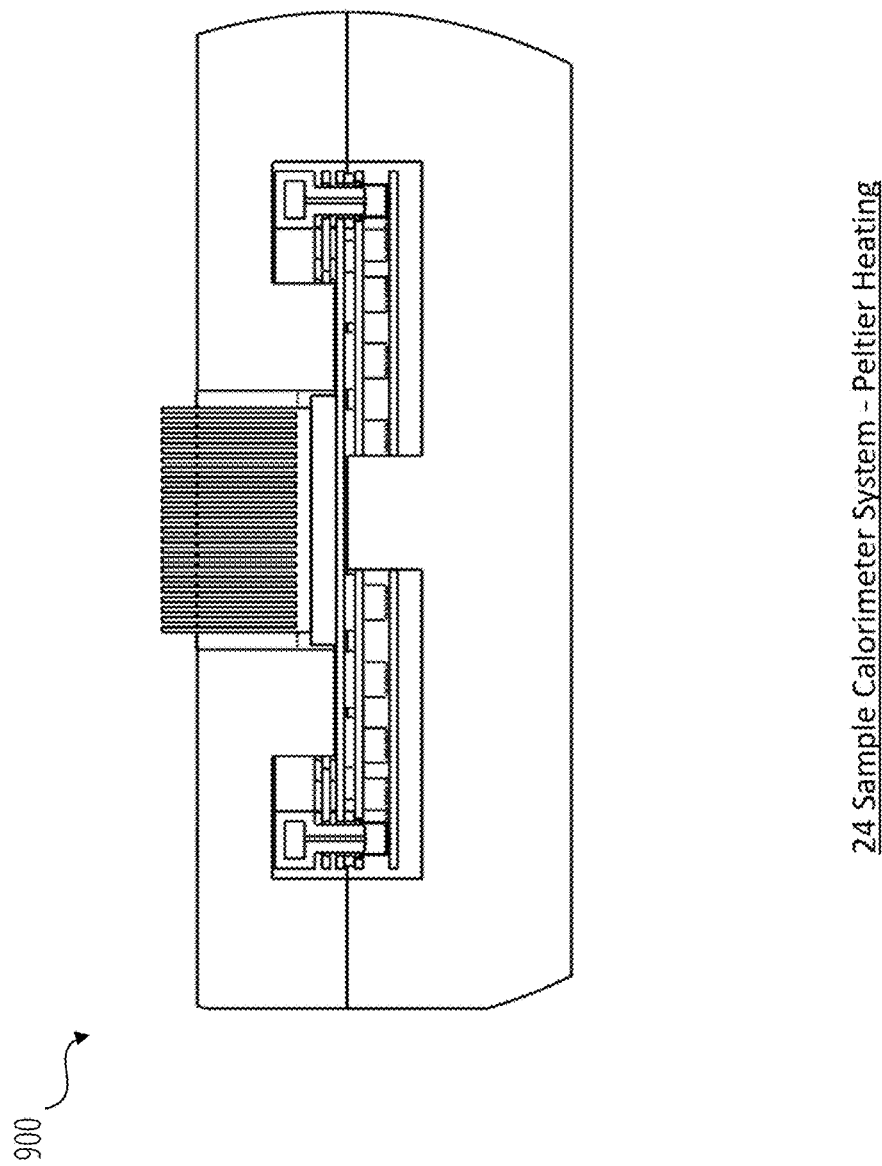
FIG. 13 is a side elevation view of the cross-section shown in FIG. 12.
Figure 14:
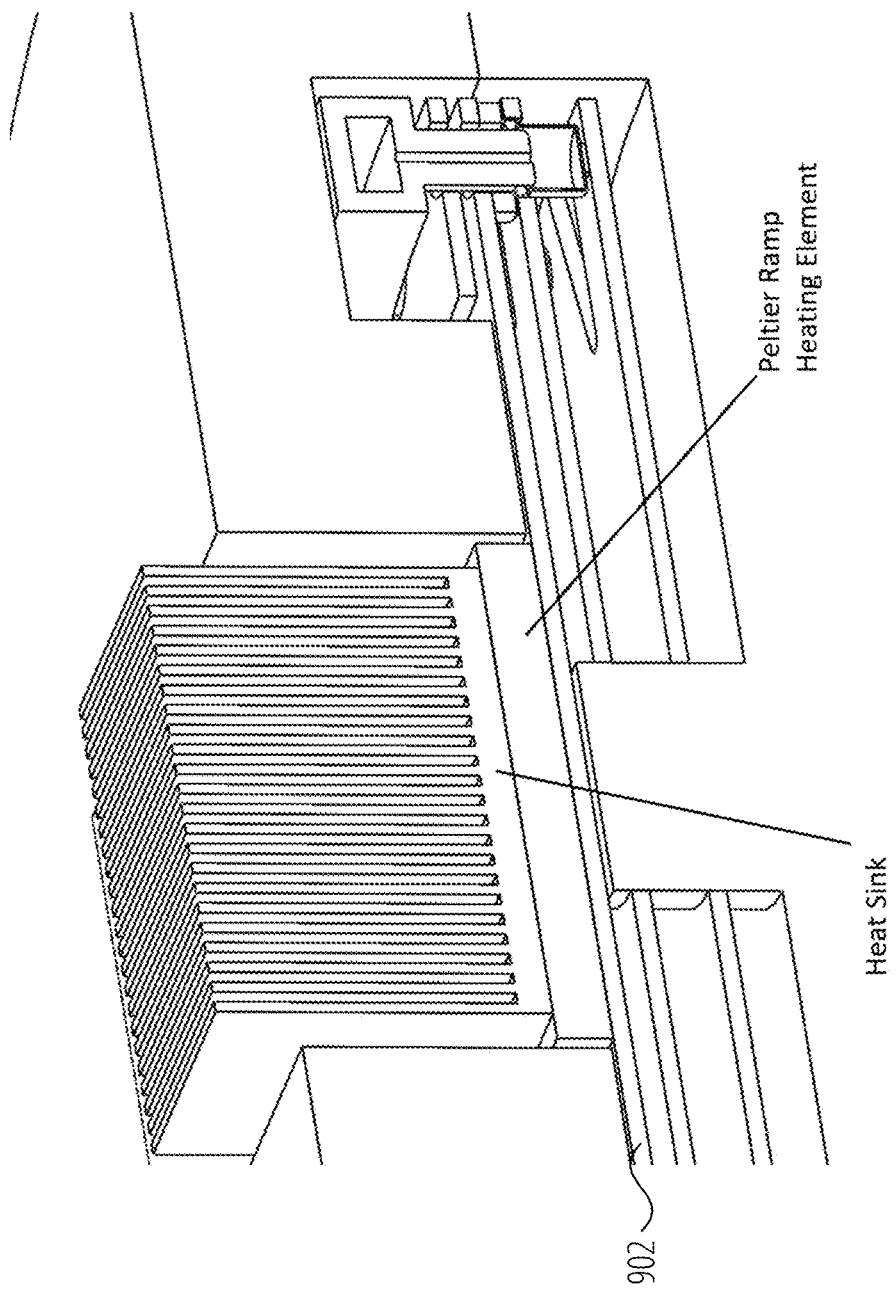
FIG. 14 is a fragmentary detail view of the cross-section of FIG. 12 showing internal components in greater detail.
Figure 15:
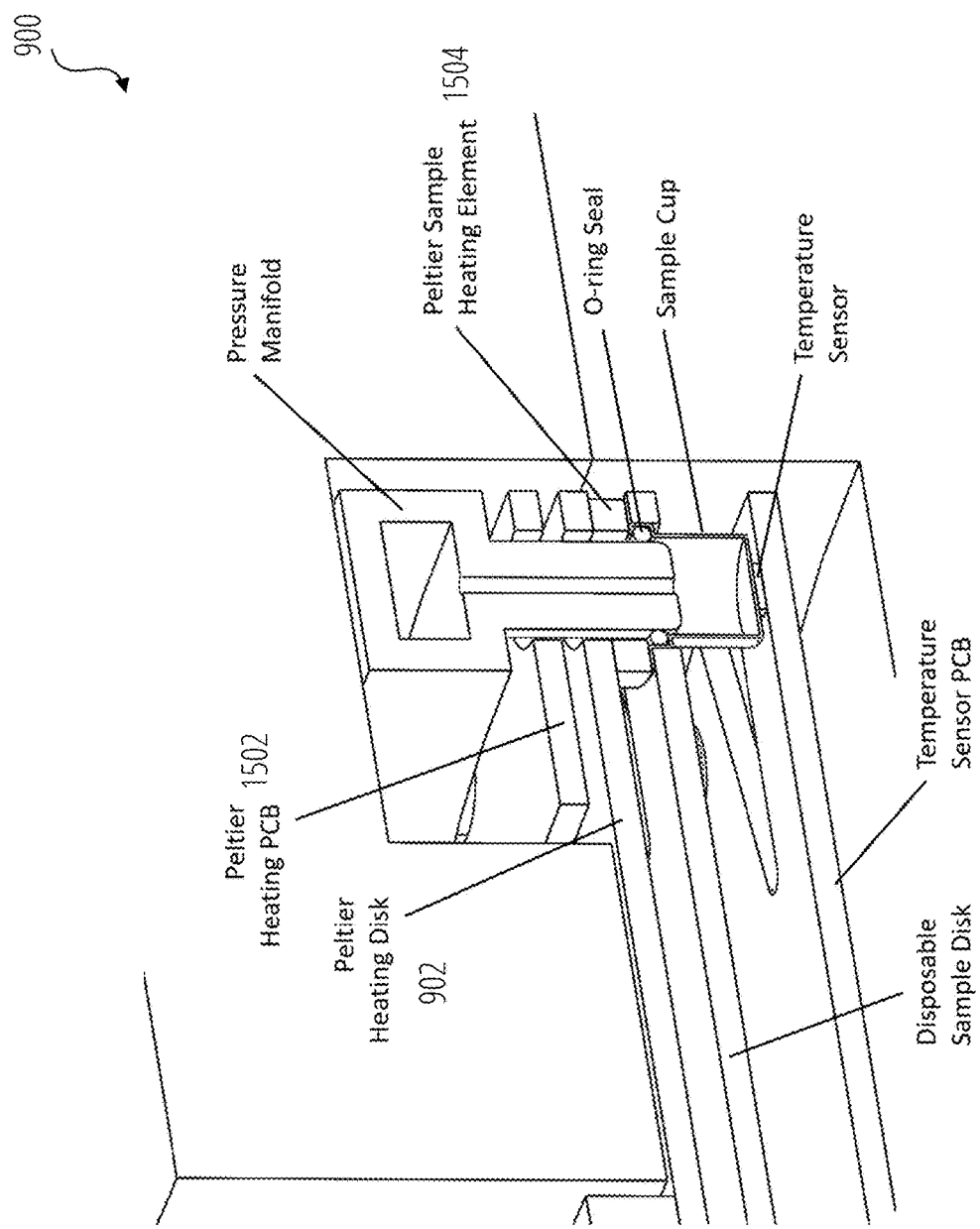
FIG. 15 is another fragmentary detail view of the cross-section of FIG. 12 showing internal components in greater detail.

FIG. 9 shows another version of a multi-sample DSC 900, which is substantially similar to multi-sample DSC 300. Unlike multi-sample DSC 300, which uses individual resistive heaters, multi-sample DSC 900 uses individual Peltier heaters on a thermally conductive Peltier heating disk 902. Furthermore, FIG. 11-FIG. 14 show that multi-sample DSC 900 optionally includes a centrally located, main Peltier heater 1202 (see, e.g., FIG. 12-FIG. 14) with an associated heat sink 1102 (FIG. 11). Main Peltier heater 1202 provides a primary heat source for heating a test chamber 904 via thermally conductive Peltier heating disk 902, as shown in FIG. 14 and FIG. 15. With main Peltier heater 1202, individual Peltier heaters may act as feedback heaters to provide incremental heat (e.g., differential heat between a sample and a reference, rather than a main heat ramp).

Because multi-sample DSC 900 includes thermally conductive Peltier heating disk 902, it also has a slightly different arrangement with its upper PCB board. For instance, FIG. 15 shows Peltier heating PCB 1502 is located behind thermally conductive Peltier heating disk 902. Peltier heating PCB 1502 includes circuitry and electrical traces for controllably powering individual Peltier heaters 1504 and main Peltier heater 1202.

Figure 16:
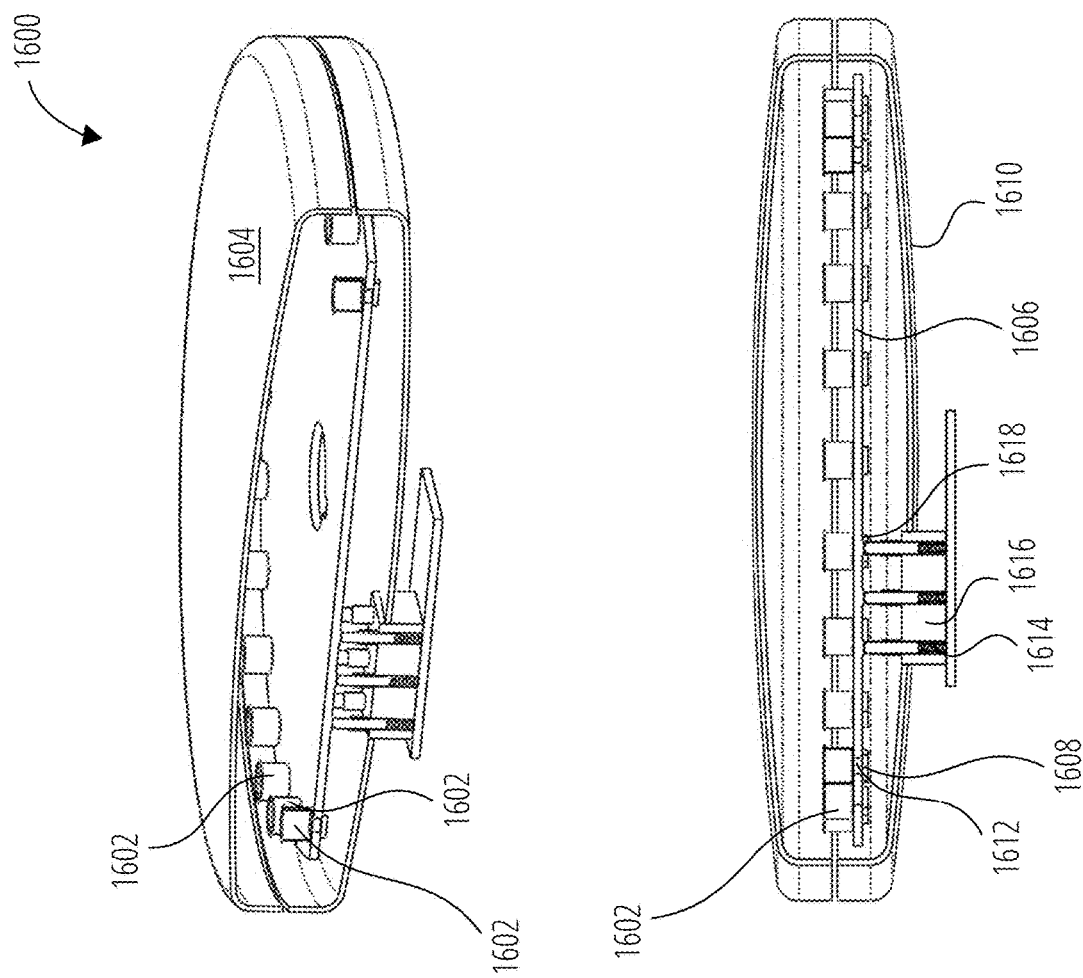
FIG. 16 is an annotated block diagram and section views of a disposable sample cartridge with multiple sample cups, in accordance with one embodiment.

FIG. 16 shows another version of a removable sample cartridge 1600 for a multi-sample DSC, in which sample cups 1602 are bonded (e.g., soldered) to, and thereby integral to, an upper surface 1604 of a PCB 1606. Corresponding temperature sensors 1608 are bonded to a lower surface 1610 of PCB 1606, such that each cup (or well) has a thermal via 1612 to its corresponding temperature sensor 1608. In this way, temperature sensor 1608 is configured to confront a thermally conductive outer surface of sample cup 1602. In the version shown FIG. 16, functions of separate disposable sample cartridge 308 and temperature sensor PCB 314 are combined in a single PCB 1606. Measurements are obtained from temperature sensor 1608 using electronic feedthrough 1614 (e.g., pogo pins or other biased contacts) that extend through a pressure/temperature chamber wall 1616 to electrically connect with test points 1618 on lower surface 1610.

In some embodiments, conventional (or standard) PCB manufacturing methods are used to: solder the metal cup in place (e.g., for larger sample volumes); create thermal vias (e.g., thermal via 1612); pick and place the temperature sensors (e.g., temperature sensor 1608, TSXOs, NTC thermistors, RTDs, semiconductor-based temperature sensors, etc.) accurately; and define gold contacts to connect to external electronics.

As described in previous embodiments, heating is applied to each sample cup 1602 and optionally to the test chamber (not shown).

Figure 17:
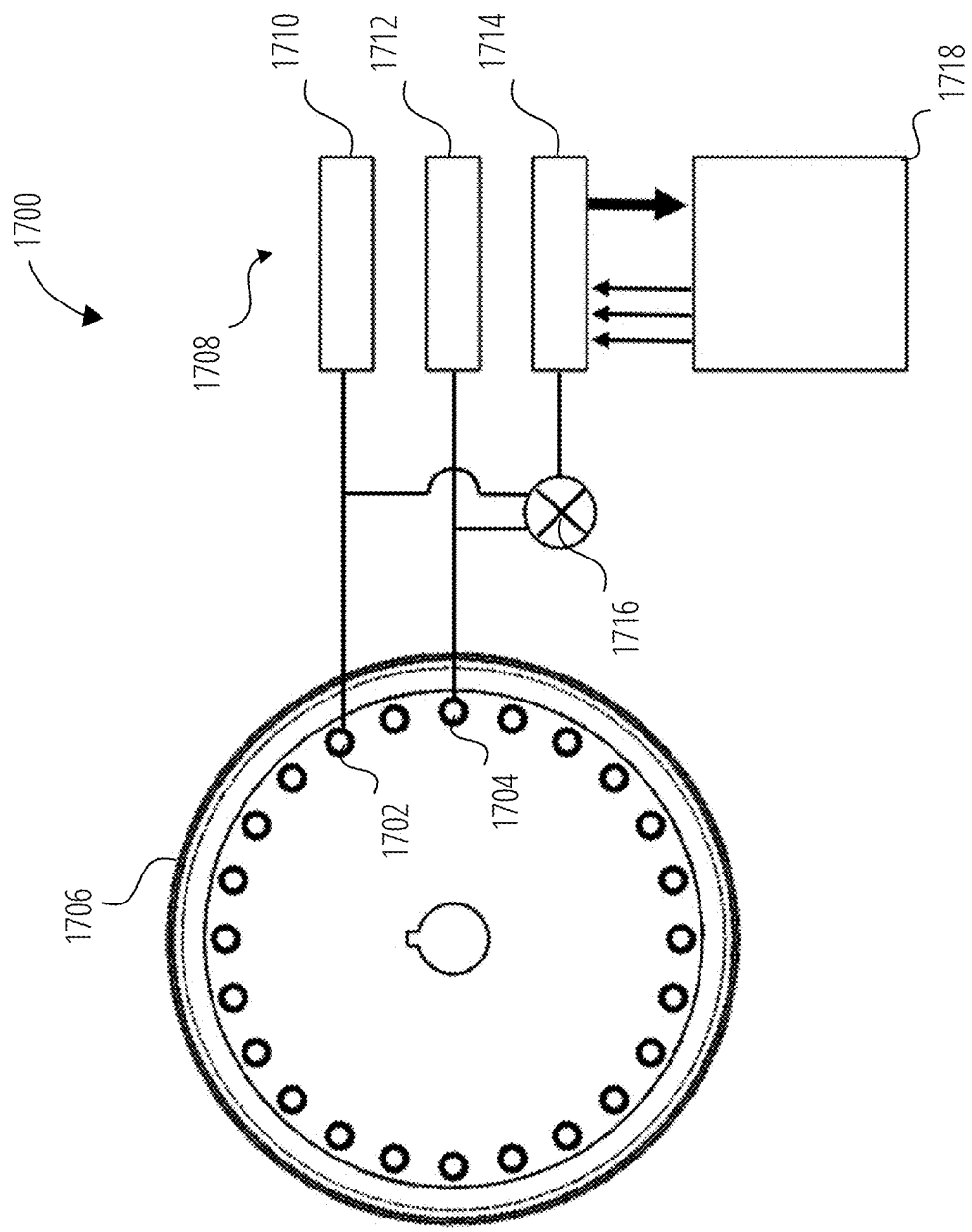
FIG. 17 is a top plan view of electrical connections between two sample wells and instrumentation circuitry, in accordance with one embodiment.

FIG. 17 shows instrumentation circuitry 1700 for comparison between two sample wells 1702 and 1704 located inside furnace 1706. Although two sample wells are shown undergoing comparison, in practice, any two different cells may be compared.

Instrumentation circuitry 1700 includes a set of counters 1708 that sample, as a function of time, peaks of temperature-dependent frequency signals produced by temperature sensors in each sample well. For instance, a counter 1710 counts the peaks in the frequency signal of the $N_{si}$ sample well, a counter 1712 counts the peaks in the frequency signal of the $N_{si+1}$ sample well, and a counter 1714 counts the peaks in the beat frequency signal from mixer 1716 that mixes the aforementioned signals. Counters 1708 are controlled by CPU 1718, which retrieves the data for further analysis. By so doing, one or more reference cells are compared to one or more sample cells, and the user can selectively configure which reference cell is to be compared with which sample cell. Comparing one reference cell to one sample cell results into a one-to-one reference-to-sample ratio. However, comparing one reference cell to "X" count of sample cells results in a one-to-X reference-to-sample ratio.

Even in cases where sample preparation errors occur, running multiple samples in a batch can reduce (or remove) sample variance. Also, by running multiple samples in a batch allows for direct comparison between individual sample cells. Direct comparisons between sample cells allow the user to utilize a ratiometric approach to sample analysis, which entails the relative comparison of one sample to another. An advantage of this approach is that ratiometric comparisons can be performed in real-time, or in near real-time, between individual cells under analogous conditions.

The described frequency-based temperature measurements allow the user to mix or compare results of individual sample cells in real-time, near real-time, or in post-processing. Also, as described in the disclosure, this method allows for factory calibration of a disposable sample cartridge during manufacturing. By so doing, the user saves time and money, and sees an increase in the accuracy of their experiment(s).

Figure 18:
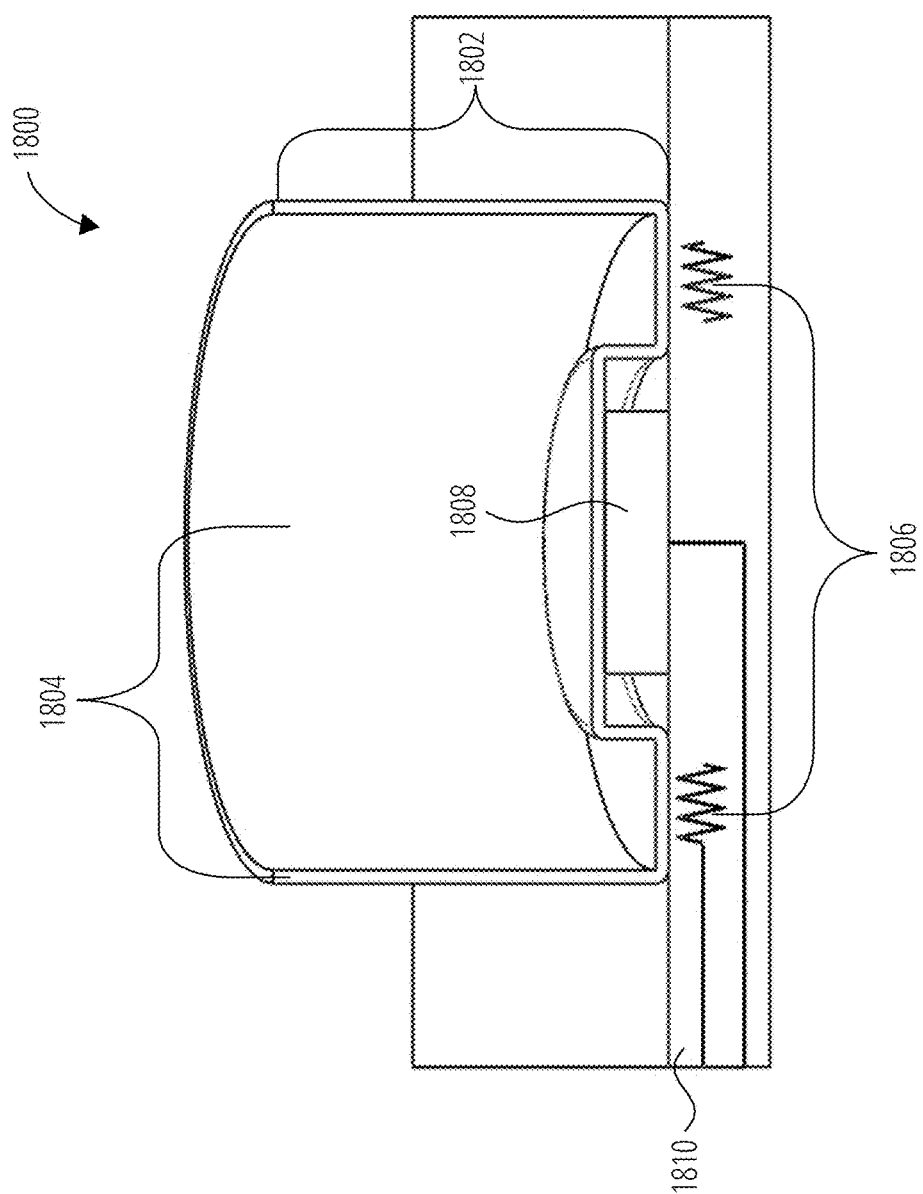
FIG. 18 is an annotated block diagram and section view of a surface mounted sample cup, in accordance with one embodiment.

FIG. 18 shows another version of a surface-mounted sample cup 1800 for a multi-sample DSC. Surface-mounted sample cup 1800 is generally cylindrical with a height 1802 and a radius 1804. Surface-mounted sample cup 1800 can be manufactured using dimensions specified by an engineer, a scientist, a medical researcher, etc. For example, if radius 1804 is five millimeters (5 mm) and height 1802 is six millimeters (6 mm), surface-mounted sample cup 1800 will provide a working volume of approximately 470 µL.

Surface-mounted sample cup 1800 is coupled to feedback heaters 1806 and temperature sensor 1808. Feedback heaters 1806 are incorporated into PCB 1810 and are wired (e.g., connected with traces) for integral or external electrical connectivity. PCB 1810 also incorporates temperature sensor 1808, which is permanently coupled to a protruding lower outer surface of surface-mounted sample cup 1800 when surface-mounted sample cup 1800 is soldered onto an upper surface of PCB 1810 and atop temperature sensor 1808.

Figure 19:
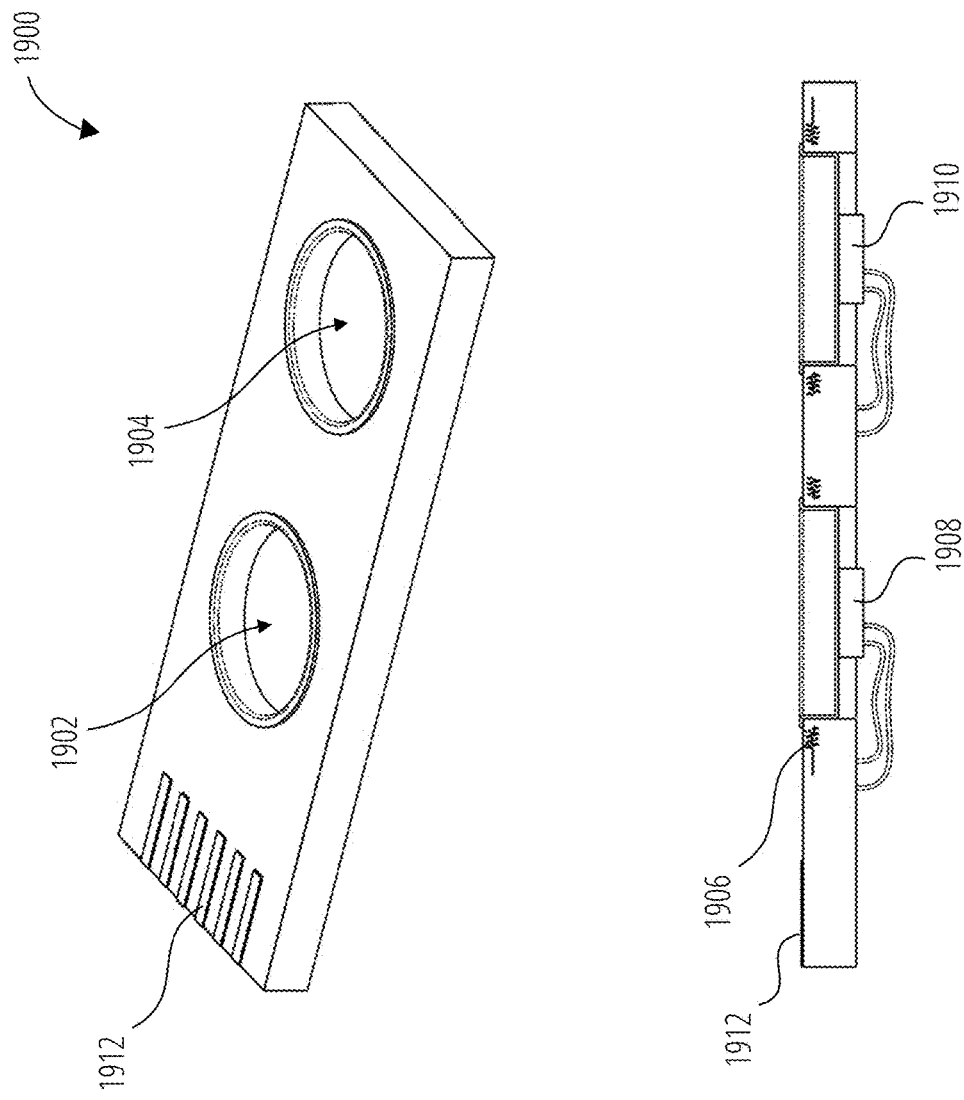
FIG. 19 is an isometric view (top) and a cross-sectional view (bottom) of a printed circuit board having a sample well and a reference well, in accordance with one embodiment.

FIG. 19 shows a PCB 1900 having a sample well 1902 and an adjacent reference well 1904. PCB 1900 includes a heater 1906 (e.g., resistance heating), a temperature sensor 1908, and a temperature sensor 1910. In some embodiments, for example, for small samples, sample well 1902, reference well 1904, heater 1906, temperature sensor 1908, and temperature sensor 1910 are integrated in the design of PCB 1900.

PCB 1900 also includes an integrated electrical connector 1912 so that PCB 1900 can be directly plugged into a corresponding (e.g., female) electrical connector (not shown) in a multi-sample DSC. For instance, a multi-sample DSC may include a test chamber with multiple female electrical connectors, each of which receives a different PCB 1900 that has been preloaded with sample or reference materials.

PCB 1900 may optionally include an integrated chip, such as an AC-to-DC converter (not illustrated in FIG. 19). The integrated chip converts to digital signals the analog signals that are received by temperature sensors 1908 and 1910.

Figure 20:
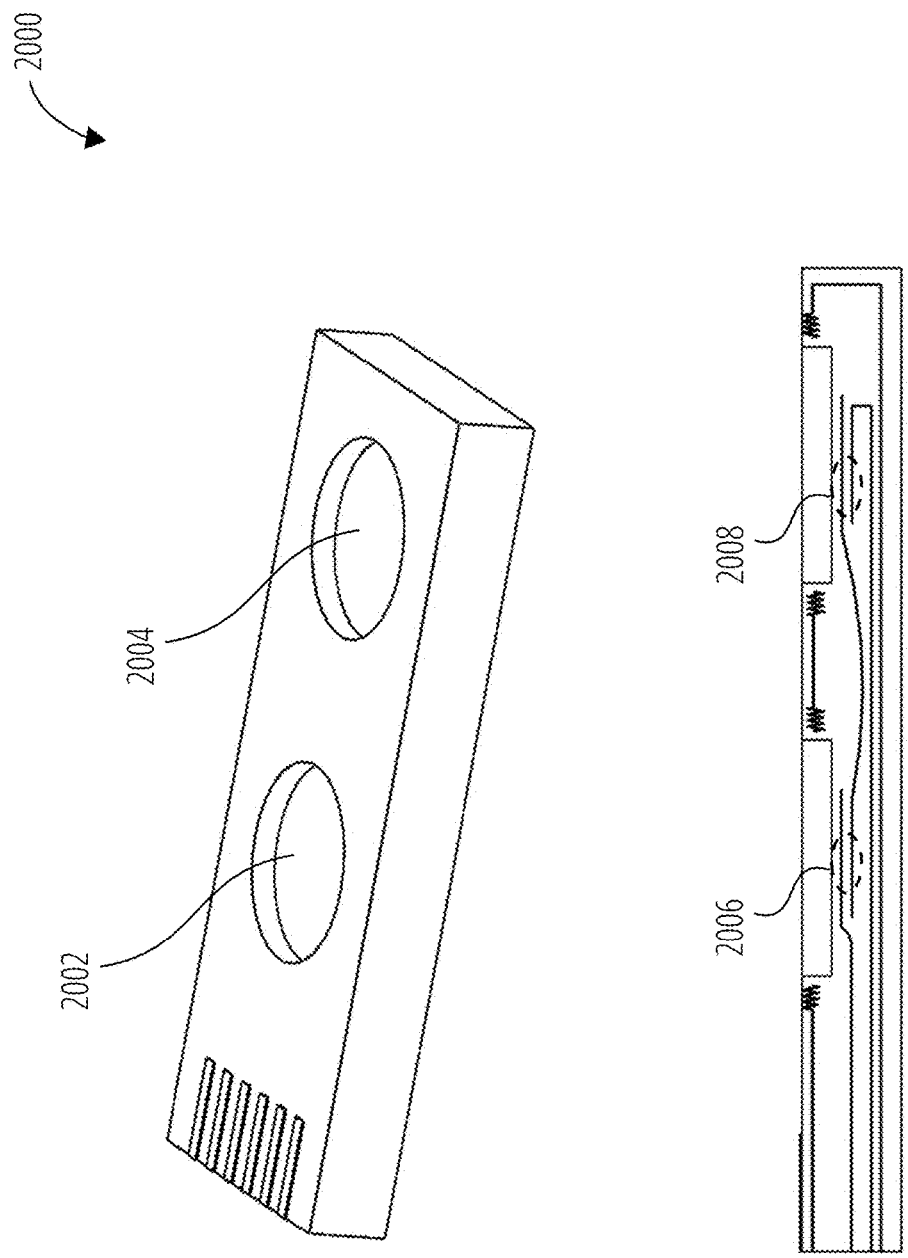
FIG. 20 is an isometric view (top) and a cross-sectional view (bottom) of another printed circuit board with a sample well, a reference well, and a plated thermocouple sensor, in accordance with one embodiment.

FIG. 20 shows a PCB 2000, which is similar to PCB 1900 (FIG. 19). Instead of discrete temperature sensors, however, PCB 2000 includes plated thermocouple sensors integrated in PCB 2000 with a sample well 2002 and a reference well 2004. The thermocouple sensor detects temperature differences at first junction 2006 and second junction 2008 for, respectively, sample well 2002 and reference well 2004. PCB 2000 also optionally includes an integrated chip, such as an AC-to-DC converter (not illustrated in FIG. 20).

Figure 21:
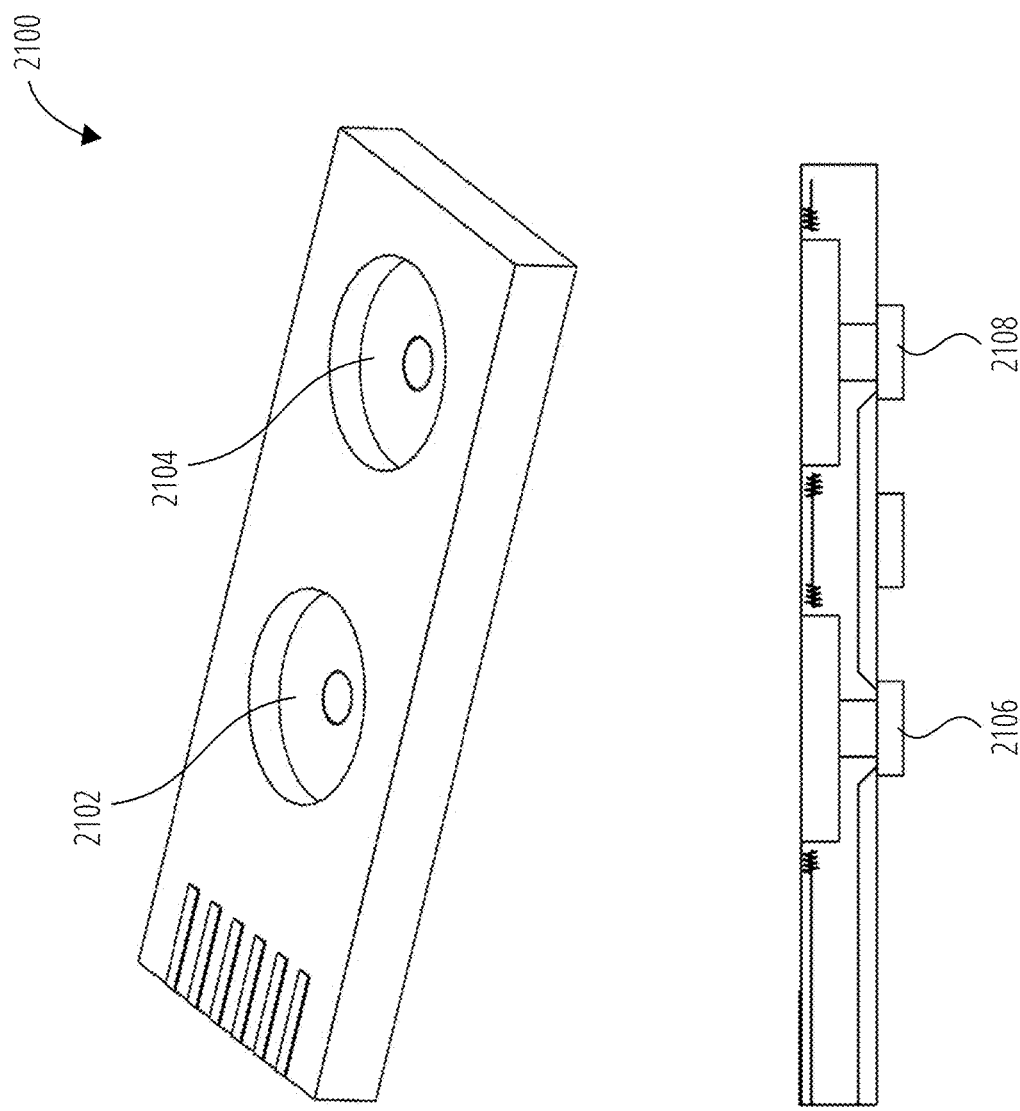
FIG. 21 is an isometric view (top) and a cross-sectional view (bottom) of another printed circuit board with a sample well, a reference well, and two temperature sensing crystal oscillators, in accordance with one embodiment.

FIG. 21 shows a PCB 2100, which is similar to PCB 1900 (FIG. 19) and PCB 2000 (FIG. 20). PCB 2100, however, includes TSXOs for each sample well 2102 and reference well 2104, and the TSXOs change frequency in response to temperature changes. In general, crystal oscillators (e.g., TSXO 2106, TSXO 2108) are designed to minimize (or lower) temperature effects using specific crystal geometries. For example, when a TSXO's temperature dependence characteristics have been defined (e.g., during a calibration process as part of manufacturing of the PCB), this digital signal is mixed with frequencies generated by another TSXO (see, e.g., FIG. 17) to generate a beat frequency that is an accurate, or a sensitive, measure of the temperature difference between TSXO 2106 and TSXO 2108. Thus, the use of TSXOs translate small temperature differences into robust (e.g., strong, one or zero, high or low) digital signals that can be transmitted using electrical connections (e.g., a pogo pin feedthrough), and the digital signals are processed using a variety of algorithmic techniques.

Figure 22:
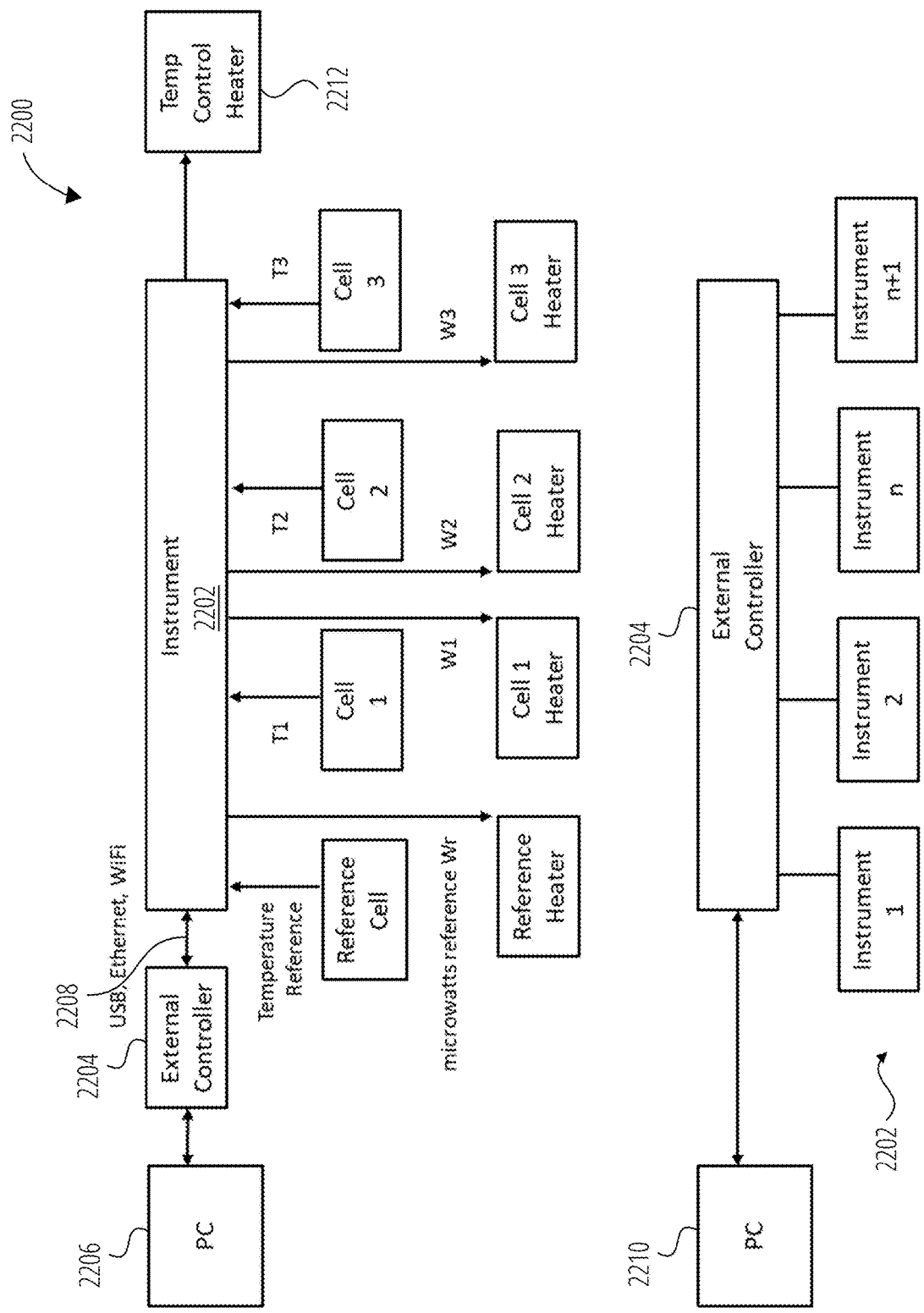
FIG. 22 is a block diagram showing electrical connections between a multi-sample DSC and an external controller, in accordance with one embodiment.

FIG. 22 shows in its upper section a multi-sample DSC system 2200 including a multi-sample DSC 2202 and an external controller application 2204 (e.g., hosted by a workstation PC 2206 or smart device) that connects to multi-sample DSC 2202 via a network connection 2208. External controller application 2204 may be a computer or a server-based system that connects to another computer. A bottom section of FIG. 22 shows how external controller application 2204 (e.g., hosted by a workstation PC 2210) may be used to simultaneously control and analyze data from multiple multi-sample DSCs 2202, e.g., in a lab environment. In some embodiments, the user can configure network connection 2208 to have external controller application 2204 networked to a plurality (e.g., 1, 2, . . . , n, n+1 count) of multi-sample calorimeter systems.

In this example of FIG. 22, multi-sample DSC 2202 includes a main temperature control heater 2212 (see, e.g., main Peltier heater 1202, FIG. 12) for generating the main heat ramp. Multi-sample DSC 2202 collects and transmits the readings from the reference cell temperature probe(s) to external controller application 2204. Based on the set temperature and heating rate, external controller application 2204 transmits the correct voltage and electrical power to a power compensation module (not illustrated in FIG. 22) of multi-sample DSC 2202 to power main temperature control heater 2212 to selectively maintain, increase, or decrease the temperature of the reference well, such that the difference in temperature between the reference well and the programmed temperature is zero (or approximately zero).

Similarly, multi-sample DSC 2202 collects and transmits the temperature readings from sample wells. Differences in temperature are detected by a feedback control module (not illustrated in FIG. 22) of external controller application 2204, and a feedback algorithm determines and communicates to the power control module to power sample well heaters, such that the difference in temperature between the sample wells and the reference well is zero (or approximately zero). The additional power needed to achieve zero (or approximately zero) temperature difference between the samples wells and the reference well is the differential heat flow that is used to construct a thermogram.

Figure 23:
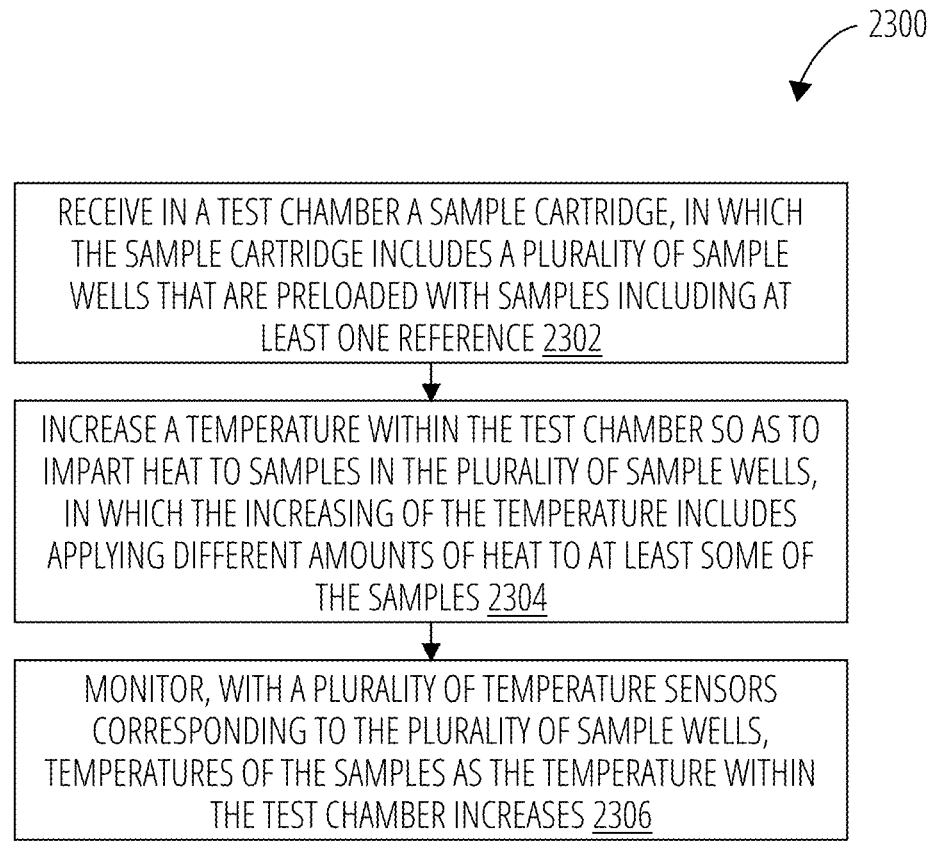
FIG. 23 is a flow chart of a process in accordance with one embodiment.

FIG. 23 shows a process 2300 for concurrent thermal measurements of a plurality of samples. In block 2302, process 2300 receives in a test chamber a sample cartridge, in which the sample cartridge includes a plurality of sample wells that are preloaded with samples including at least one reference. In block 2304, process 2300 increases a temperature within the test chamber so as to impart heat to samples in the plurality of sample wells, in which the increasing of the temperature includes applying different amounts of heat to at least some of the samples. In block 2306, process 2300 monitors, with a plurality of temperature sensors corresponding to the plurality of sample wells, temperatures of the samples as the temperature within the test chamber increases, in which each temperature sensor is configured to confront a thermally conductive surface of a respective sample well for sensing a respective temperature. In some embodiments, process 2300 optionally entails pressurizing at least one of the plurality of sample wells. As described previously, in some embodiments each one of plurality of temperature sensors produces a frequency signal such that different signals can be mixed to detect differences in temperatures.

Figure 24:
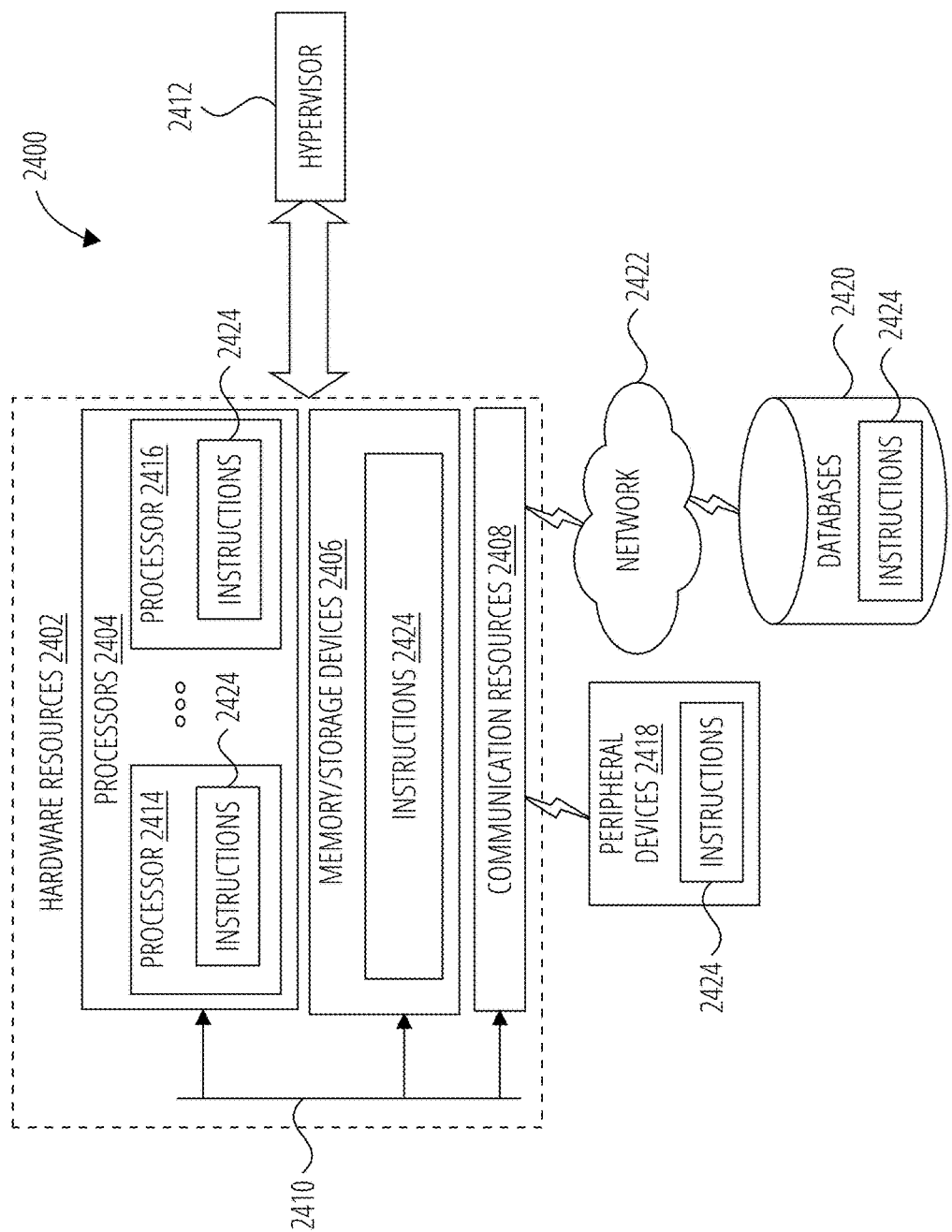
FIG. 24 is a block diagram of computing components for performing the disclosed processes, in accordance with one embodiment.

FIG. 24 is a block diagram illustrating components 2400, according to some example embodiments, able to read instructions from a machine-readable or computer-readable medium (e.g., a non-transitory machine-readable storage medium) and perform any one or more of the methods discussed herein, such as a process 2300. For instance, the computer-readable storage medium may includes instructions that when executed by a multi-sample DSC, cause the multi-sample DSC to receive in a test chamber a sample cartridge, in which the sample cartridge includes a plurality of sample wells that are preloaded with samples including at least one reference, each sample well being integral to the sample cartridge; increase a temperature within the test chamber so as to impart heat to samples in the plurality of sample wells, in which the increasing of the temperature includes applying a different amount of heat to at least one sample; and monitor, with a plurality of temperature sensors corresponding to the plurality of sample wells, temperatures of the samples as the temperature within the test chamber increases, in which each temperature sensor is configured to confront a thermally conductive surface of a respective sample well for sensing a respective temperature.

Specifically, FIG. 24 shows a diagrammatic representation of hardware resources 2402 including one or more processors 2404 (or processor cores), one or more memory/storage devices 2406, and one or more communication resources 2408, each of which may be communicatively coupled via a bus 2410. For embodiments where node virtualization (e.g., NFV) is utilized, a hypervisor 2412 may be executed to provide an execution environment for one or more network slices/sub-slices to utilize hardware resources 2402.

Processors 2404 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), another processor, or any suitable combination thereof) may include, for example, a processor 2414 and a processor 2416.

Memory/storage devices 2406 may include main memory, disk storage, or any suitable combination thereof. Memory/storage devices 2406 may include, but are not limited to, any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

Communication resources 2408 may include interconnection or network interface components or other suitable devices to communicate with one or more peripheral devices 2418 or one or more databases 2420 via a network 2422. For example, communication resources 2408 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 2424 may comprise software, a program, an application, an applet, an app, or other executable code for causing at least any of processors 2404 to perform any one or more of the methods discussed herein. Instructions 2424 may reside, completely or partially, within at least one of processors 2404 (e.g., within the processor's cache memory), memory/storage devices 2406, or any suitable combination thereof. Furthermore, any portion of instructions 2424 may be transferred to hardware resources 2402 from any combination of peripheral devices 2418 or databases 2420. Accordingly, the memory of processors 2404, memory/storage devices 2406, peripheral devices 2418, and databases 2420 are examples of computer-readable and machine-readable media.

Concluding Remarks

The innovations described above enable a few presently envisioned use cases. In the first, is screening drug candidates for binding to a target. The present inventors have shown it is possible to measure a drug's binding constant and stoichiometry to a target by measuring the relative change in a thermogram as a function of drug concentration. With current instrumentation, this requires taking measurements of a drug candidate with the target over a range of 5-10 concentrations in duplicate (or triplicate) (see, e.g., FIG. 2). Because of instrumental limitations described above, there are extensive experimental controls and instrumental cleaning that must occur to complete the experiment. The result is that for a single drug and target combination with ten concentrations, with duplicates, requires a minimum of 40 hours of run time, not including time for cleaning.

Considering that when developing a new drug/target, a company may generate thousands of initial candidates that must be screened; serial processing is not capable of meeting the market needs. However, using the sample cartridge described in the disclosure will enable orders of magnitude increases in sample throughput. For example, if one assumes an embodiment with 80 cells per cartridge, this will allow the measurement of four separate candidates over ten different concentrations, in duplicate, in a single two-hour run time, with no requirement for instrument cleaning. Alternatively, it would allow for initial screening of 80 separate candidates at one time. This enables direct comparison between candidates in a single experiment, a feature not currently available.

In vitro expression systems (prokaryotic and eukaryotic) are the source of many specially engineered low abundance molecules and biopharmaceuticals (biologics). Expression systems provide a means for generating important biological molecules (proteins, peptides, antibodies), on various scales, relatively fast for reasonable cost. Unfortunately, isolation and purification of expressed molecules can be expensive and time consuming. For a moderately abundant and soluble protein, conventional purification strategies can require 27 individual steps and four days to complete. The present inventors have demonstrated the ability to determine protein concentrations and detect ligand binding in these expression systems prior to purification.

However, the current method requires multiple steps of expression background measurement, expression background with target measurement, and post-processing to account for experimental variability. Again, with thousands of candidates to process, serial processing with the extensive post-processing steps is not commercially feasible. Parallel processing on a single cartridge would allow direct comparison between the expression background and the expression background with a target. This comparison may be done either through signal comparison or through the establishment of a beat frequency for the samples.

In light of this disclosure, skilled persons will appreciate that many changes may be made to the details of the above-described embodiments without departing from the underlying principles of the invention. The scope of the present invention should, therefore, be determined only by claims and equivalents.

What is claimed is:

1. A multi-sample differential scanning calorimeter (DSC), the DSC comprising:
   a test chamber;
   a removable sample cartridge configured to fit inside the test chamber, in which the removable sample cartridge comprises a plurality of sample wells, each sample well being integral to the removable sample cartridge;
   a plurality of heating elements corresponding to the plurality of sample wells, in which each sample well is configured to engage an associated heating element for heating a respective sample;
   a plurality of temperature sensors corresponding to the plurality of sample wells, in which each sample well is configured to engage an associated temperature sensor for sensing a respective temperature;
   a processor configured to selectively determine a difference in temperature between any two or more sample wells of the plurality of sample wells; and
   in which the test chamber is configured to receive different sample cartridges having different numbers of sample wells or different volumes of sample wells.

2. The DSC of claim 1, in which the plurality of temperature sensors are built into the removable sample cartridge.

3. The DSC of claim 1, in which the plurality of temperature sensors generate a temperature dependent frequency, a temperature dependent frequency datum, or temperature dependent frequency data.

4. The DSC of claim 3, in which the temperature dependence is linear or monotonic.

5. The DSC of claim 3, in which the plurality of temperature sensors comprise crystal oscillators.

6. The DSC of claim 3, in which at least one of the plurality of temperature sensors comprises a discrete resistive element, and further comprises circuitry to convert changes on resistance to frequency variation.

7. The DSC of claim 3, in which the temperature dependence is calibrated for each temperature sensor and its respective sample well during manufacturing of the removable sample cartridge and the plurality of temperature sensors, or during calibration prior to a sample run using the test chamber.

8. The DSC of claim 7, in which the calibration is correlated to the removable sample cartridge using a unique identification (ID) of the removable sample cartridge.

9. The DSC of claim 8, in which the unique ID comprises a barcode, a quick response (QR) code, a radio-frequency identification (RFID) tag or code, or combinations thereof.

10. The DSC of claim 8, in which the temperature dependent frequency data are corrected based on calibration data to generate an accurate reading of the temperature.

11. The DSC of claim 3, in which the processor is further configured to mix:
   a first frequency associated with a first sample in a first sample well;
   a second frequency associated with a second sample in a second sample well; and
   a beat frequency, the beat frequency comprises a differential temperature between the first and the second sample.

12. The DSC of claim 11, in which one of the first or the second sample comprises a reference sample.

13. The DSC of claim 11, in which the processor is further configured to drive a first and a second heating element of a heating instrument associated with the first and the second sample wells, respectively, to bring the first and the second samples into a temperature equilibrium.

14. The DSC of claim 3, in which the plurality of temperature sensors comprise micro electronic mechanical systems (MEMS) tuning forks.

15. The DSC of claim 3, in which the removable sample cartridge further comprises a plurality of heating elements.

16. The DSC of claim 1, in which the processor is further configured to selectively determine an average of the temperature between any two or more sample wells of the plurality of sample wells.

17. The DSC of claim 1, in which the processor is further configured to log or track the temperature between any two or more sample wells.

18. The DSC of claim 1, in which the test chamber further comprises:
- a base with a temperature sensor printed circuit board (PCB); and
- a lid with a heating instrument with a plurality of heating elements.

19. The DSC of claim 18, in which the temperature sensor PCB comprises the plurality of temperature sensors.

20. The DSC of claim 18, in which the heating instrument comprises a resistance heating PCB.

21. The DSC of claim 18, in which the heating instrument comprises a Peltier heating PCB.

22. The DSC of claim 18, in which each heating element increases the temperature, in a pre-determined temperature ramp, of a respective sample well to match a pre-determined target temperature.

23. The DSC of claim 18, in which the removable sample cartridge is thermally isolated, the thermal isolation lowers thermal losses of a sample inside any of the plurality of sample wells during a sample run.

24. The DSC of claim 18, in which the removable sample cartridge comprises a controller, the controller is configured to generate energy pulses to sequentially modulate a temperature of each sample in each sample well of the plurality of sample wells.

25. The DSC of claim 18, in which each of the plurality of heating elements is calibrated to remove or reduce sample-to-sample temperature variations.

26. The DSC of claim 1, in which the test chamber comprises a manifold configured to distribute a pre-defined pressure to each of the plurality of sample wells.

27. The DSC of claim 26, in which the pre-defined pressure is the same and constant for each of the plurality of sample wells.

28. The DSC of claim 26, in which:
- the manifold comprises a plurality of plenums, and in which a count of the plurality of plenums is equal to a count of the plurality of sample wells; and
- the manifold is further configured to selectively vary a pressure of each sample in each of the plurality of sample wells during a sample run.

29. The DSC of claim 1, further comprising a circuitry substrate including the plurality of temperature sensors and the plurality of heating elements.

30. The DSC of claim 1, in which each sample well confronts multiple heating elements or multiple temperature sensors.

* * * * *